(12) United States Patent
Yamaguchi

(10) Patent No.: US 9,698,658 B2
(45) Date of Patent: Jul. 4, 2017

(54) MANUFACTURING DEVICE AND MANUFACTURING METHOD FOR STATOR OF ROTATING ELECTRICAL MACHINE

(75) Inventor: Kazuyuki Yamaguchi, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 549 days.

(21) Appl. No.: 14/342,132

(22) PCT Filed: Aug. 27, 2012

(86) PCT No.: PCT/JP2012/071585
§ 371 (c)(1),
(2), (4) Date: Feb. 28, 2014

(87) PCT Pub. No.: WO2013/035571
PCT Pub. Date: Mar. 14, 2013

(65) Prior Publication Data
US 2014/0201979 A1    Jul. 24, 2014

(30) Foreign Application Priority Data

Sep. 6, 2011  (JP) .................................. 2011-194129

(51) Int. Cl.
H02K 15/00   (2006.01)
H02K 15/06   (2006.01)
H02K 15/02   (2006.01)

(52) U.S. Cl.
CPC ......... *H02K 15/065* (2013.01); *H02K 15/026* (2013.01); *H02K 15/066* (2013.01); *Y10T 29/49009* (2015.01); *Y10T 29/53143* (2015.01)

(58) Field of Classification Search
CPC .. H02K 15/067; H02K 15/066; H02K 15/065; H02K 15/026; Y10T 29/53143; Y10T 29/49009
(Continued)

(56) References Cited

U.S. PATENT DOCUMENTS

| 7,185,413 B2 * | 3/2007 | Kuroyanagi ....... H02K 15/0037 140/92.1 |
| 2004/0055139 A1 | 3/2004 | Kuroyanagi et al. |

(Continued)

FOREIGN PATENT DOCUMENTS

| CN | 102792568 A | 11/2012 |
| JP | 2004-72839 A | 3/2004 |

(Continued)

OTHER PUBLICATIONS

International Search Report of PCT/JP2012/071585, dated Oct. 30, 2012.

(Continued)

*Primary Examiner* — Peter DungBa Vo
*Assistant Examiner* — Azm Parvez
(74) *Attorney, Agent, or Firm* — Sughrue Mion, PLLC

(57) ABSTRACT

A manufacturing device for a stator of a rotating electrical machine includes a jig, a support section, link mechanisms and press sections. The jig has holding grooves into which linear portions of coils can be respectively inserted. The jig can be arranged on the inner side of a stator core while holding grooves respectively face the openings of slots. Each of the link mechanisms has a push-out member and a link. The link moves a corresponding push-out member in a direction from the bottom portion of the holding groove to a corresponding slot and in a direction from the slot to the bottom portion. The push-out members can concurrently apply a pressing force to all the coil ends of the coils from the axial direction of the stator core in synchronization with the link mechanisms.

8 Claims, 12 Drawing Sheets

(58) Field of Classification Search
USPC .................. 29/596, 592.1, 732, 729, 700
See application file for complete search history.

(56) References Cited

U.S. PATENT DOCUMENTS

| | | |
|---|---|---|
| 2004/0068858 A1 | 4/2004 | Kuroyanagi et al. |
| 2004/0098856 A1 | 5/2004 | Kuroyanagi et al. |
| 2005/0005422 A1 | 1/2005 | Kuroyanagi et al. |
| 2013/0000105 A1 | 1/2013 | Hasegawa et al. |

FOREIGN PATENT DOCUMENTS

| | | |
|---|---|---|
| JP | 2005-110341 A | 4/2005 |
| JP | 2007-166849 A | 6/2007 |
| JP | 2007-166850 A | 6/2007 |
| JP | 2009-195011 A | 8/2009 |
| WO | 03/012962 A1 | 2/2003 |

OTHER PUBLICATIONS

Chinese Office Action dated Aug. 5, 2015, in corresponding Chinese Patent Appln. No. 2012800429730.
International Preliminary Report on Patentability dated Mar. 12, 2014 from the International Searching Authority in counterpart Application No. PCT/JP2012/071585.

\* cited by examiner

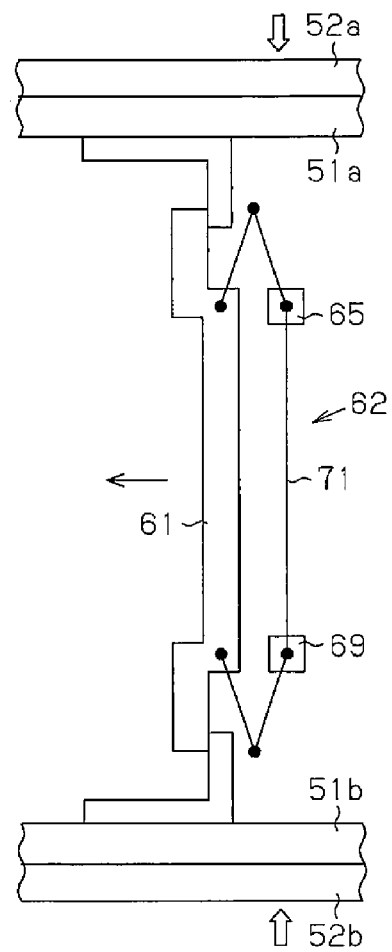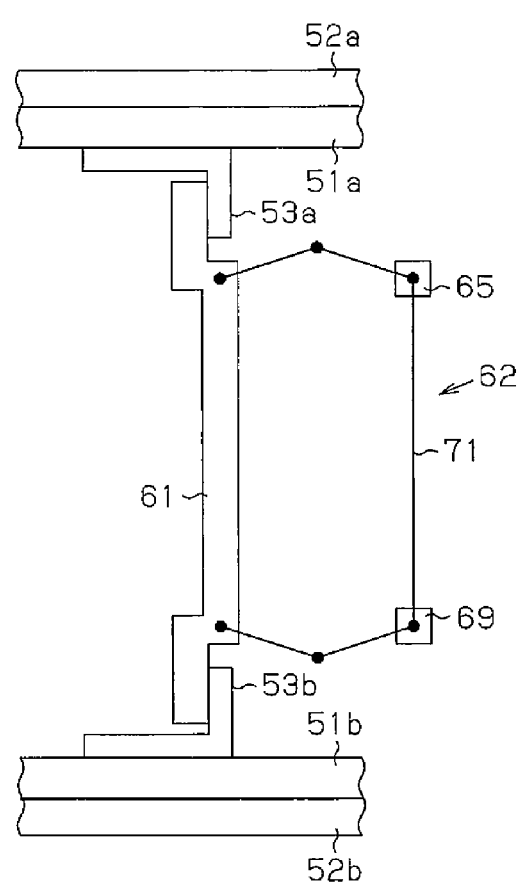

MANUFACTURING DEVICE AND MANUFACTURING METHOD FOR STATOR OF ROTATING ELECTRICAL MACHINE

CROSS REFERENCE TO RELATED APPLICATIONS

This application is a National Stage of International Application No. PCT/JP2012/071585 filed Aug. 27, 2012, claiming priority based on Japanese Patent Application No. 2011-194129, filed Sep. 6, 20111, the contents of all of which are incorporated herein by reference in their entirety.

TECHNICAL FIELD

The present invention relates to a device and a method for manufacturing a stator of a rotating electrical machine, and, more particularly, to a device and a method for manufacturing a stator formed by inserting a plurality of straight portions of each coil, which are formed in advance in a winding wire (conductive wire), into different slots.

BACKGROUND ART

An annular stator core includes a plurality of slots formed in the radial direction. Each slot is groove-shaped and opens in an inner circumference of the stator core. A plurality of coils, formed in advance to form closed loops, are inserted into the annular stator core as distributed windings. In this case, the distance between straight portions that are inserted into two slots in each coil needs to be widened in conformance with the groove shape of the slots that extend in the radial direction.

In the prior art, when inserting generally tortoise-shell-shaped coils into the slots of a fixed iron core (stator core), pushing pieces are used to radially push out the straight portions of a coil so that the straight portions are moved along and inserted in the slots (refer to patent document 1). In this case, the two upper and lower end portions of the coil are formed to be V-shaped. Thus, when the straight portions are moved along the slots, the two upper and lower end portions are deformed to approach the fixed iron core. Patent document 1 also describes that the cross-sectional shape of the conductive wire of the coil is not limited to a substantially circular shape and may have a different shape such as a rectangular shape.

A further proposed method for manufacturing a stator inserts first sides (straight portions) of a plurality of coils into a plurality of first slots of a stator core, and then inserts second sides (straight portions) of the plurality of coils into a plurality of second slots, which differ from the first slots, so that the coils are spirally overlapped as viewed from the end face of the stator core (see patent document 2). The method of patent document 2 uses a jig that includes a first holding groove group and a second holding groove group formed on an outer circumference. The first holding groove group includes a plurality of slit-shaped holding grooves that formed at a pitch that is an integral multiple of the pitch of the slots of the stator core. The second holding groove group is formed at the same pitch as the first holding groove group. The first sides of the plurality of coils, which are wound in advance, are respectively inserted to the first holding groove group, the second sides are respectively inserted into the holding grooves of the second holding groove group that are adjacent to the holding grooves into which the first sides are inserted. Then, each coil is arranged along the circumference of the jig. The jig is inserted to the inner circumference of the stator core. Subsequently, the first side of each coil is pushed toward the outer side in the radial direction by a pushing means and inserted into the corresponding slot of the stator core. Then, the jig is rotated by a predetermined angle relative to the slot of the stator core and positioned so that the second holding grooves are aligned with the corresponding slots of the stator core. Subsequently, the second sides are pushed toward the outer side in the radial direction by the pushing means and inserted into the corresponding slots of the stator core.

PRIOR ART DOCUMENT

Patent Document

Patent Document 1: Japanese Laid-Open Patent Publication No. 2009-195011
Patent Document 2: Japanese Laid-Open Patent Publication No. 2007-166849

DISCLOSURE OF THE INVENTION

When using an easily deformable material (winding wire) such as a round wire is used, as described in patent document 1, the straight portions of the coils may be pushed out from the radially inner side toward the radially outer side of the stator core to widen the cores along the slots so that the coils are inserted into the slots. However, when the coils are formed by rectangular wires, the coils cannot deform as easy as the round wires. Thus, the coils do not easily deform when the straight portions are just pushed. Thus, the coils need to be pushed into the slot with an extremely large force as a large friction force acts between the straight portions and slot wall surfaces.

The method of patent document 2 needs for the coils to be formed by easily deformable material such as round wires and the arrangement of a winding wire bundle forming the straight portions (first side and second side) inserted into the slots to be changed in accordance with the shapes of the slot and the holding groove. Therefore, the method of patent document 2 cannot be applied to coils formed by rectangular wires in which the shapes of the first side and the second side cannot be changed in accordance with the shapes of the slots and the holding grooves.

It is an object of the present invention to provide a device and a method for manufacturing a stator for a rotating electrical machine capable of obviating deformation and damage of a stator core and coils even when the cores are formed by rectangular wires and need a large force to be deformed and inserted into the slots of the state core.

To achieve the above object, one aspect of the present invention provides a manufacturing device for a stator of a rotating electrical machine. The stator includes an annular stator core, which includes a plurality of slots, and a coil attached to the stator core. Each of the slots includes an opening, which opens in an inner circumference of the stator core, and a bottom portion. The slots are arranged at a slot pitch from an adjacent one of the slots. The slot pitch increases from the opening toward the bottom portion. The coil includes a plurality of straight portions, which are respectively inserted into the slots, and a plurality of coil ends, which are continuous with the straight portions. The manufacturing device is provided with a jig, a support unit, a plurality of link mechanisms, and a plurality of pushing units. The jig includes a plurality of holding grooves into which the straight portions of the coil are insertable. Each of the holding grooves includes a bottom portion and an opening. Adjacent ones of the holding grooves are arranged at a pitch that is the same as the openings of the adjacent ones of the slots in the stator core. The jig is arrangeable at an inner side of the stator core when the holding grooves respectively face the openings of the slots. The support unit supports the stator core and the jig, which is arranged at the inner side of the stator core, in a concentric state. The link mechanisms are provided in the jig. Each of the link mechanisms includes a pushing member and a link. The pushing member is arrangeable closer to the bottom portion of each holding groove than the straight portion inserted into the holding groove. The link is arranged at an outer side of an end face of the stator core in an axial direction and at an inner side in a radial direction of the stator core from the pushing member. The link moves the corresponding pushing member in a direction from the bottom portion of the holding groove toward the corresponding slot and from the slot toward the bottom portion. The plurality of pushing units simultaneously applies a pushing force from the axial direction of the stator core to all of the coil ends of the coil in synchronism with the link mechanism when the straight portions are respectively inserted into the holding grooves of the jig supported by the support unit and the coil ends respectively project outside in the axial direction of the stator core from an end face of a portion including the holding grooves of the jig.

The "slot pitch" refers to the distance between the center lines of two adjacent slots.

In the structure described above, the coil is formed in advance by a winding wire. The coil is set in the jig when a plurality of straight portions are inserted into the holding grooves of the jig toward an open side from the pushing member arranged in the holding groove and the coil ends project outside from the end faces of the portion including the holding groove of the jig. The jig to which the coil is set is supported by the support unit when the stator core is arranged at an inner side of the stator core. In this state, the pushing force is simultaneously applied from the axial direction of the stator core to all of the coil ends by the pushing unit to increase the distance between the straight portions of the coil. Further, in synchronism with the application of the pushing force to the coil ends by the pushing unit, the pushing member arranged in each holding groove is moved from the bottom portion of the holding groove toward the corresponding slot by the link mechanism, and each straight portion of the coil is pushed out of the holding groove to the corresponding slot by the pushing member so that the coil is coupled to the stator core.

The slot pitch is the smallest at the position of the opening of the slot and the largest at the bottom portion of the slot. Thus, when the straight portion inserted in the holding groove of the slot is simply pushed out toward the slot of the stator core, the coil is moved toward the bottom portion of the slot with the interval between the straight portions of the coil being smaller than the slot pitch. Thus, the coil is moved while increasing the interval of the straight portions with the reaction force from the wall surface of the slot as the straight portions of the coil come into contact with the wall surface of the slot. This may deform or damage the wall surface of the slot and the coil. In the present invention, however, the coil is moved toward the bottom portion of the slot by the pushing member while increasing the intervals between the straight portions of the coil with the pushing force from the pushing unit. This obviates deformation and damage of the stator core and the coil even when the coil is deformed and inserted into the slot of the stator core in which a large force is used to deform the coil when the coil is formed by a rectangular wire.

Preferably, each of the pushing units includes a pushing member that is provided for each of the coil ends and allows for application of a pushing force to each coil end toward a radially outer side of the stator core.

In the structure described above, the pushing unit also applies, to the coil end, pushing force acting toward the radially outer side. Thus, the straight portion of the coil receives the force acting to move the straight portion toward the bottom portion of the slot from both of the pushing member and the pushing member. Specifically, the straight portion of the coil directly receives the force from the pushing member and also indirectly receives the force from the pushing unit. The straight portion of the coil is thereby pushed out of the holding groove into the corresponding slot. Therefore, the straight portion is further smoothly moved.

Preferably, the plurality of pushing units are two pushing units arranged at two axial sides of the stator core sandwiching the stator core supported by the support unit. Each of the two pushing units includes a support plate and a turning plate. The support plate includes a plurality of straight guide grooves each extending parallel to the slots in correspondence with the slots of the stator core. The turning plate includes a spiral guide groove and is supported to be turnable at a side of the support plate opposite to the stator core. Each pushing member includes a portion that is movable along the straight guide groove and an engagement portion that engages the spiral guide groove.

In the structure described above, the pushing member, which applies to each coil end a pushing force acting toward the outer side of the stator core and a pushing force acting in a direction squeezing the coil in the axial direction of the stator core, moves in the slot of the stator core along the straight guide groove. The movement force of the pushing member is applied through the engagement portion that engages with the spiral guide groove. The spiral guide groove is formed in the turning plate. This simplifies a mechanism for applying the movement force to the pushing member even if there are a large number of pushing members.

Preferably, the support plate of one of the two pushing units is movable with the corresponding turning plate and the pushing member to a position where the support plate is not an obstacle trouble when moving the stator core to a position where the stator core is supported by the support unit or when removing the stator core from the position where the stator is supported by the support unit.

When the stator core supported by the support unit with the jig in which the coil is set in the holding groove, the straight portion of the coil is moved from the holding groove to the slot of the stator core and the coil is inserted and coupled to the stator core. After inserting and coupling the coil, the stator core needs to be removed from the support unit. In order to remove the stator core from the support unit, the pushing unit needs to be held so as not to interfere with the stator core and the coil. In the present invention, one of a set of support plates in a pair of pushing units is formed to move the stator core to a position where the stator core is supported by the support unit or a position where the stator core is removed from the position supported by the support unit without interfering with the turning plate and the pushing member. Thus, the area where the device is set may be reduced compared to when both of the support plates in a set of support plates are movable.

Preferably, the manufacturing device further includes two drive force applying units located at two ends of the jig in the axial direction of the stator core. The two drive force applying units applies to at least each of the pushing member a drive force for moving the pushing member from the bottom portion of the corresponding holding groove to the corresponding slot.

In the structure described above, the drive force applied by a single drive force applying unit becomes small compared to a structure in which the drive force applying unit for applying the drive force that moves the pushing member from the bottom portion of the holding groove to the slot is arranged on one side so as to sandwich the jig.

Preferably, each of the link mechanisms uses a biasing force of a torsion spring as the drive force for moving the pushing member to the bottom portion of the holding groove.

In the structure described above, the pushing member is moved to the standby position of the holding groove by the biasing force of the torsion spring. Thus, when supporting the stator core with the support unit or when removing the stator core from the support unit, the pushing member is held at the bottom portion of the holding groove, that is, the standby position, even if the drive force applying unit is disengaged from the drive unit that supplies drive force to the drive force applying unit and a state is maintained in which the interval that does not interfere with the movement of the stator core and the setting operation of the coil to the jig is provided between the drive unit and the drive force applying unit. This simplifies the structure that holds the pushing member at the standby position of the holding groove even if the he drive force applying unit is disengaged from the drive unit.

Preferably, the support unit is formed to be movable to a standby position and an inserting position, the stator core and the jig are removed from the support unit at the standby position, and a center position of the stator core supported by the support unit is located coaxially with a pushing portion of the pushing unit to insert the coil into the stator core at the inserting position.

Preferably, the straight portions are a set of a first side and a second side. Each of the plurality of coil ends is a coil end having a projecting shape. Each of the first side and the second side includes a first end and a second end, and the coil ends are continuous with the first ends and the second ends.

A further aspect of the present invention is a manufacturing method for a stator of a rotating electrical machine in which the stator includes an annular stator core, which includes a plurality of slots, and a coil attached to the stator core. Each of the slots includes an opening, which opens in an inner circumference of the stator core, and a bottom portion. The slots are arranged at a slot pitch from an adjacent one of the slots, and the slot pitch increases from the opening toward the bottom portion. The coil includes a plurality of straight portions, which are respectively inserted into the slots, and a plurality of coil ends, which are continuous with the straight portions. The manufacturing method includes preparing a jig including a plurality of holding grooves into which the straight portions of the coil are insertable. Each of the holding grooves includes a bottom portion and an opening. Adjacent ones of the holding grooves are arranged at a pitch that is the same as the openings of the adjacent ones of the slots in the stator core. The jig is arranged at an inner side of the stator core in a state in which the holding grooves respectively face the openings of the slots. A pushing member is arranged at the bottom portion of each of the holding grooves. The coils are inserted into the jig so that each of the straight portions is arranged closer to an opening of the jig than a position where the pushing member is arranged in the holding groove of the jig. The coil ends project outside in an axial direction of the stator core from an end face of a portion including the holding grooves of the jig. A pushing force from the axial direction of the stator core is simultaneously applied to all of the coil ends of the coil with a pushing unit to increase a distance between the straight portions. The pushing force is applied with the pushing unit and a force is simultaneously applied to the coil for pushing the straight portion, which is inserted into each of the holding grooves, out of the holding groove and into the corresponding slot with the pushing member to simultaneously insert all of the straight portions into the slots of the stator core.

In the manufacturing method of the present invention, the coil incorporated in the stator core is formed in advance by a winding wire. The coil is set in the jig with a plurality of straight portions inserted into the holding grooves of the jig at an opening side of the pushing member arranged in the holding groove and with the coil ends projecting outside from the two end faces of the portion including the holding groove of the jig. The jig in which the coil is set is arranged inside the stator core. The pushing member is arranged at the bottom side (radially inner side) of the position where the straight portion is inserted into the holding groove. The pushing force is simultaneously applied from the axial direction of the stator core to all of the coil ends by the pushing unit in this state to increase the interval between the straight portions of the coil. Furthermore, in synchronism with the application of the pushing force to the coil ends by the pushing unit, the pushing member arranged in each holding groove is moved from the bottom portion of the holding groove toward the corresponding slot by the link mechanism, and each straight portion of the coil is pushed out of the holding groove into the corresponding slot by the pushing member so that the coil is coupled to the stator core.

Accordingly, in the same manner as the above aspect, the stator of the rotating electrical machine may be manufactured while obviating deformation and damage of the stator core even when the coils are formed by rectangular wires and need a large force to be deformed and inserted into the slots of the state core.

Preferably, force is applied to each of the pushing members through a link mechanism with a pushing unit to move each of the pushing members along the holding grooves.

Preferably, the coil is one of a plurality of coils, and the coil is ring-shaped and includes two straight portions and two coil ends.

In the structure described above, the method is suitable for manufacturing the stator in which the coil is incorporated in the stator core as a distributed winding.

Preferably, each of the coil ends is a coil end having a projecting shape, each of the two straight portions includes a first end and a second end, and the coil ends are continuous with the first ends and the second ends.

BRIEF DESCRIPTION OF THE DRAWINGS

FIGS. 16A and 16B are schematic diagrams each showing a structure of a pushing unit of another embodiment.

DETAILED DESCRIPTION OF THE PREFERRED EMBODIMENTS

First Embodiment

A first embodiment of the present invention for manufacturing a stator in which coils are coupled to a stator core in a lap winding will now be described with reference to FIGS. 1 to 10.

Figure 1:
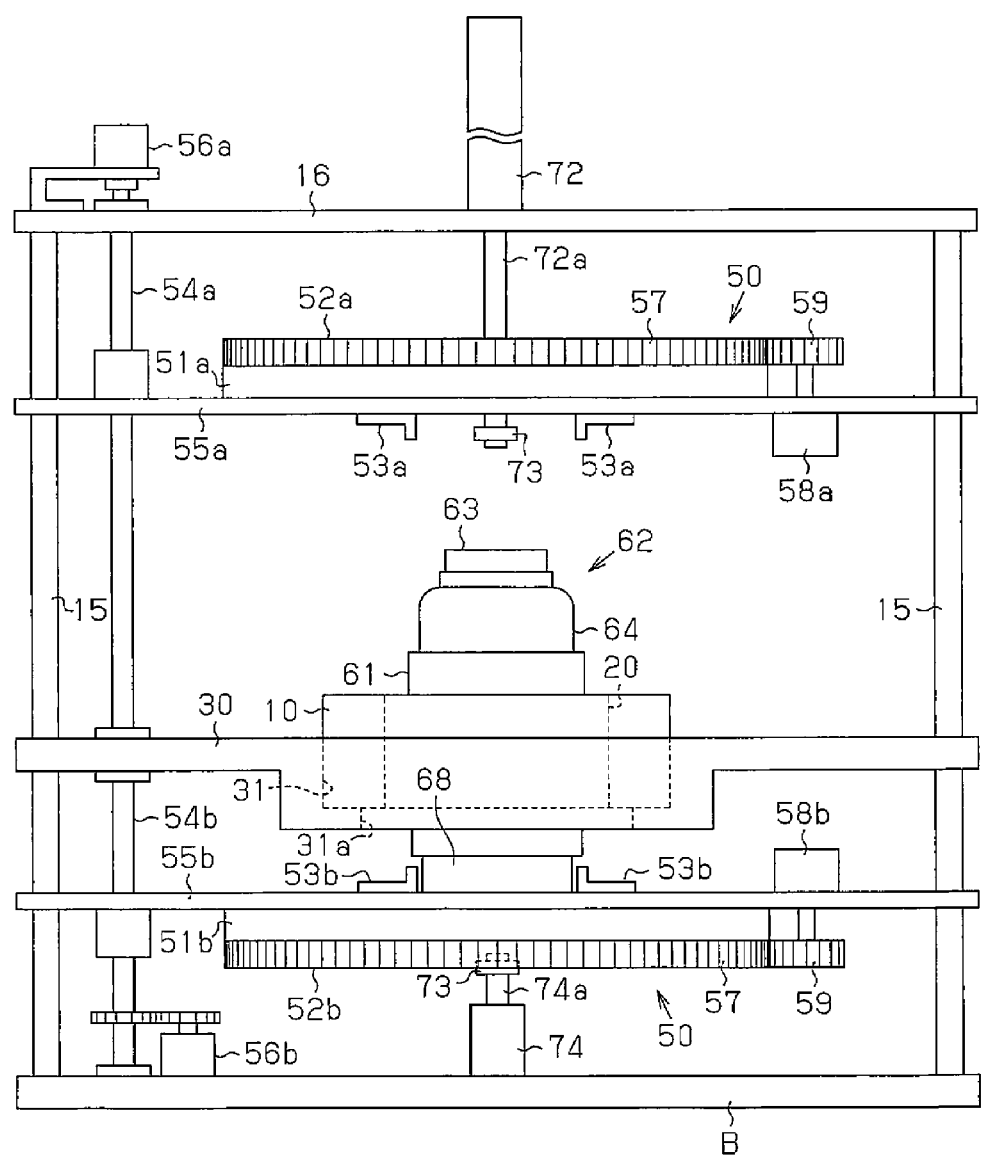
FIG. 1 is a schematic front view entirely showing a state manufacturing device according to a first embodiment of the present invention.
Figure 2:
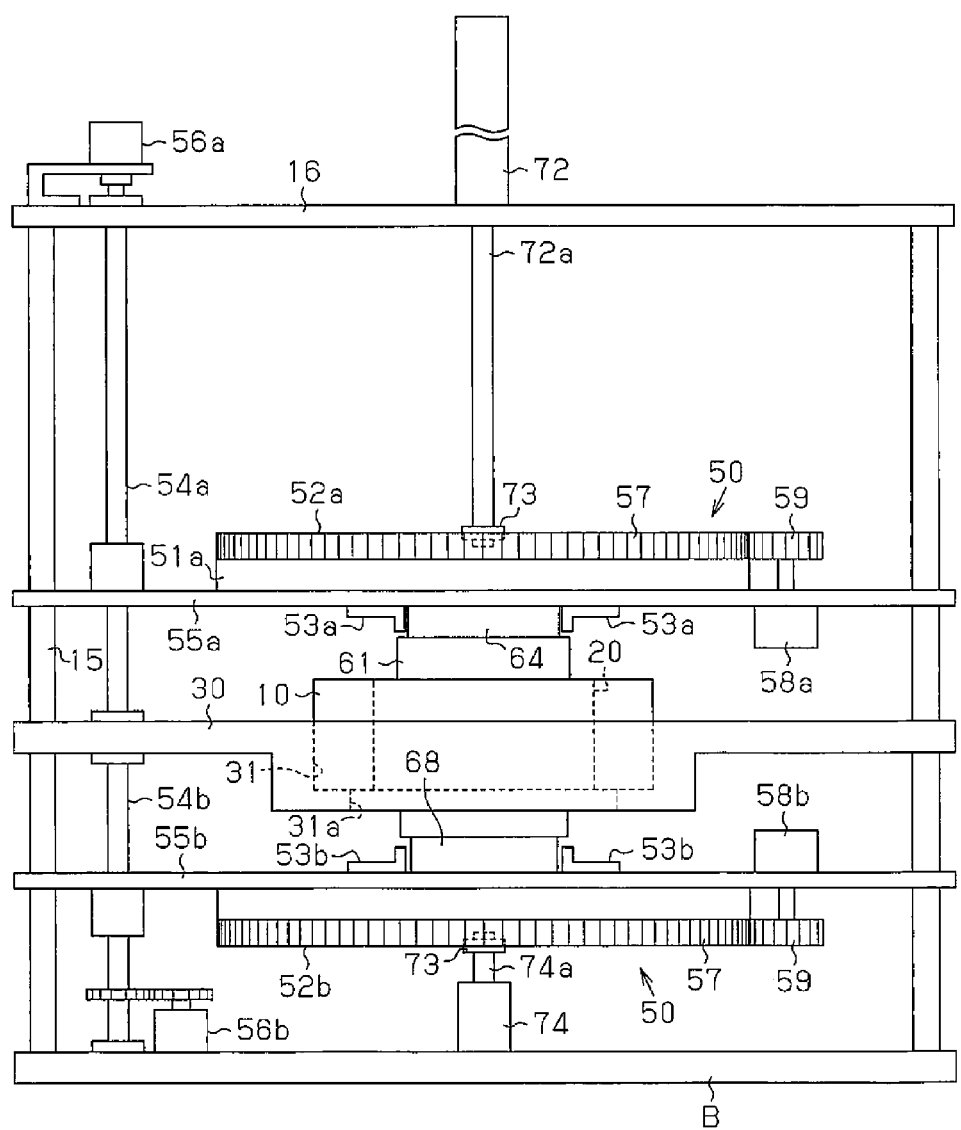
FIG. 2 is a schematic front view entirely showing the stator manufacturing device of FIG. 1.

As shown in FIGS. 1 and 2, a stator manufacturing device includes a support unit 30 for supporting a stator core 10 and a jig 20, two pushing units 50 for applying a pushing force to coils 40 (refer to FIGS. 4 to 6 or the like), and a plurality of link mechanisms 62 for applying a force in a radial direction of the stator core 10 to the coils 40, which are pushed and deformed by the two pushing units 50. Each link mechanism 62 forms a pushing unit. The stator manufacturing device includes a plurality of (48 in the present embodiment) the link mechanisms 62 as described later. However, FIGS. 1 and 2 do not show each link mechanism 62 and schematically shows a representative link mechanism 62.

Figure 4:
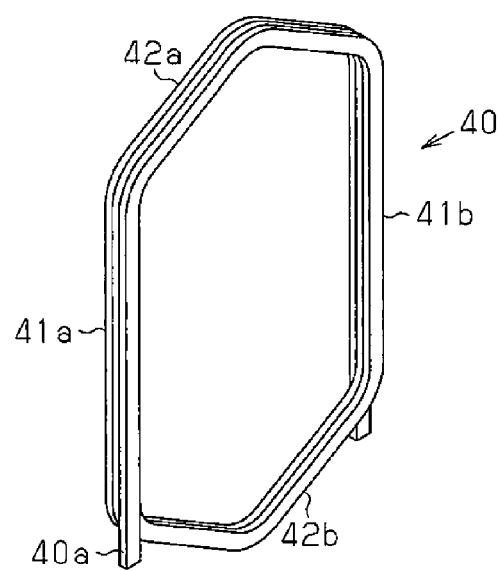
FIG. 4 is a schematic perspective view of a coil.

As shown in FIG. 4, a rectangular wire serving as a winding wire 40a is used as the coil 40. The winding wire 40a is wound edgewise in the form of a vertically elongated tortoise shell. That is, the coil 40 is formed by winding the winding wire 40a a multiple number of times, as shown in FIG. 4. The rectangular wire is coated by an insulator.

The coil 40 includes a first side 41a and a second side 41b, which serve as straight portions and extends in parallel, and coil ends 42a, 42b, which are continuous with the first side 41a and the second side 41b and are bent to be mountain-shape and extend in opposite directions. In other words, the two coil ends 42a, 42b are formed to have projecting shapes. The first side 41a and the second side 41b are formed to be longer than the axial length of the stator core 10 so that the ends project out of the end faces of the stator core 10 when the first side 41a and the second side 41b are inserted (accommodated) in the slots 12. In FIG. 4, the coil 40 has a simple tortoise shell shape, but actually, the coil ends 42a, 42b are formed to be twisted state (twisting not shown in drawings) and so that the opposing surfaces of the first side 41a and the second side 41b have a tapered shape and the adjacent coils 40 do not interfere with each other when set in the jig 20. Each of the coil ends 42a, 42b has a projection (not shown) at the mountain peak to hold contact with pushing members 53a, 53b of the pushing unit 50, which will be described later.

Figure 7:
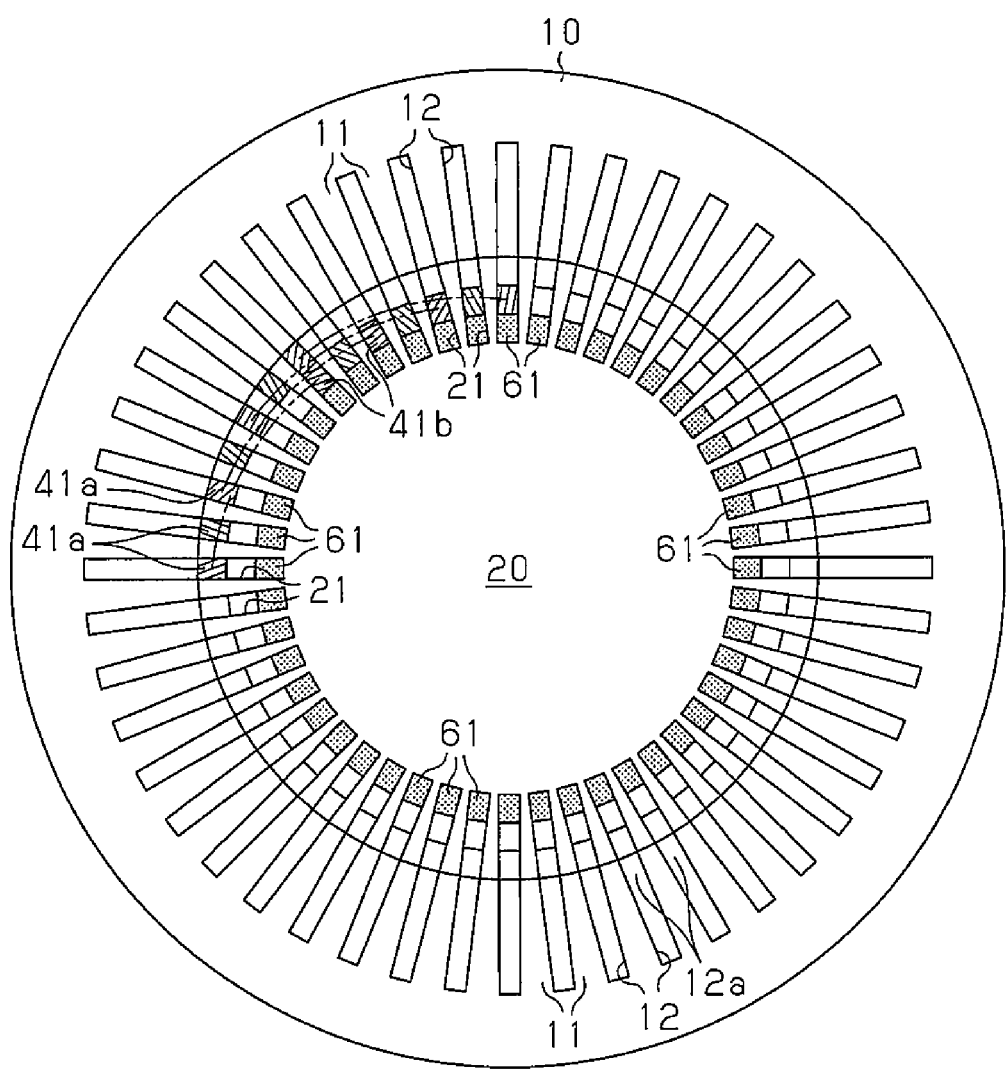
FIG. 7 is a schematic plan view showing the jig, to which the coil of FIG. 4, arranged at an inner side of the stator core.

As shown in FIG. 7, the stator core 10 is annular (circular ring shape). An inner circumferential portion of the stator core 10 includes a plurality of (48 in the present embodiment) teeth 11 arranged at a constant interval in the circumferential direction of the stator core 10. The center line of each tooth 11 lies along a straight line radially extending from the center of the stator core 10. A slot 12 is formed between adjacent teeth 11. Each slot 12 has an opening 12a that opens in the inner circumference of the stator core 10, and the slot pitch of the slots increases from the opening 12a toward the bottom portion. The slot pitch is the distance between the center lines of two adjacent slots 12. Each slot 12 is formed to have a length allowing for the accommodation of two first sides 41a and two second sides 41b, that is, a total of four straight portions.

Figure 5:
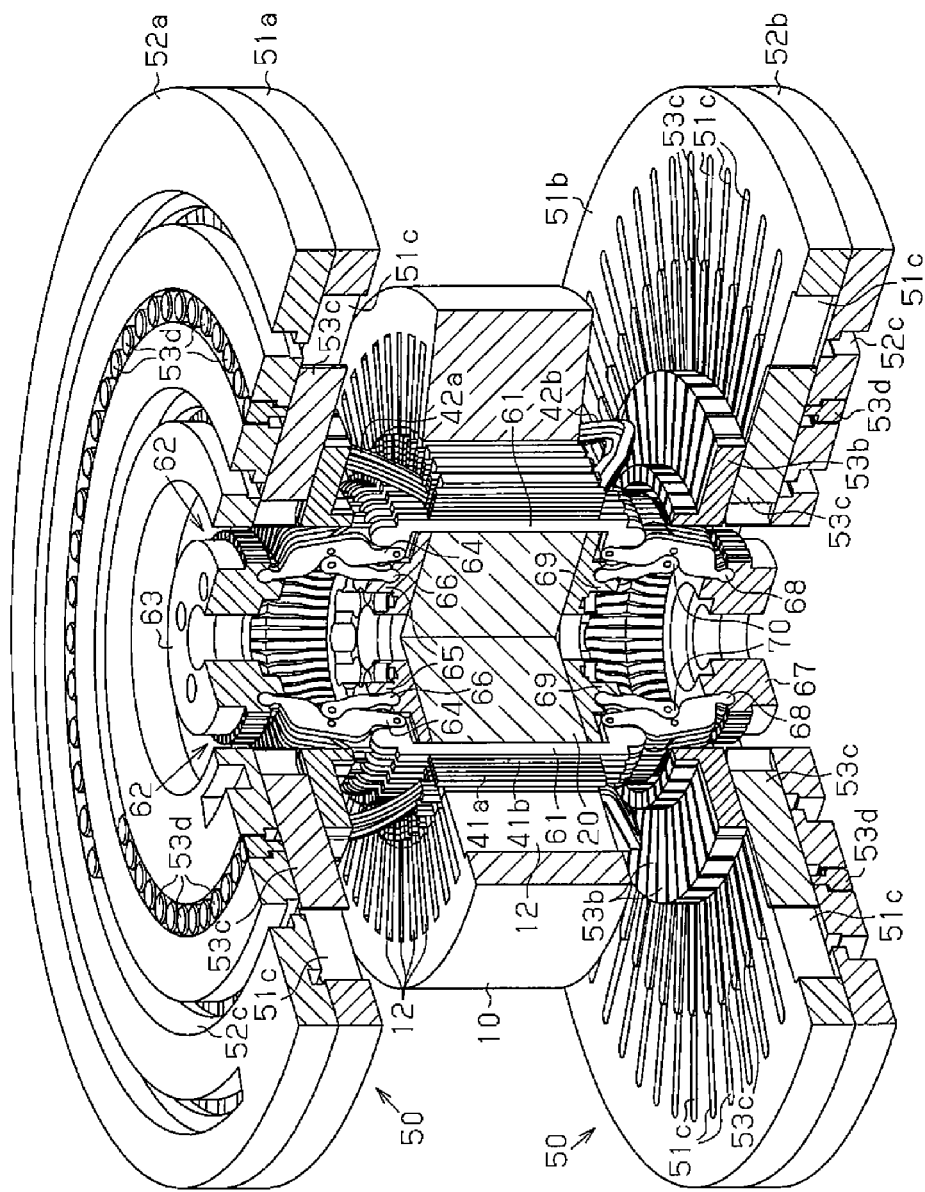
FIG. 5 is a schematic perspective view showing the coil of FIG. 4 set in a jig.
Figure 6:
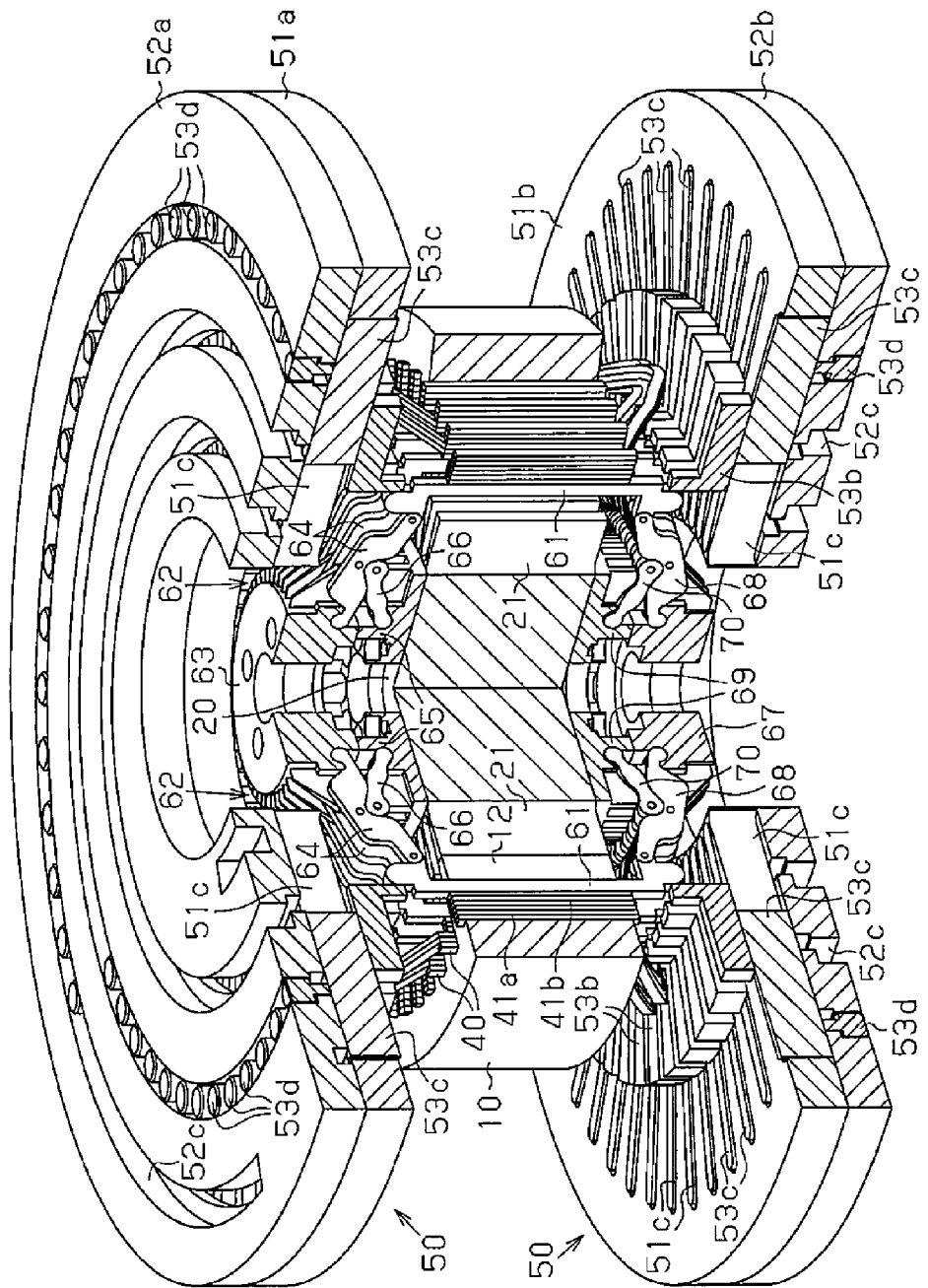
FIG. 6 is a schematic perspective view showing the coil of FIG. 4 inserted into slots.

As shown in FIGS. 5 to 7, the jig 20 is substantially cylindrical and includes a plurality of holding grooves 21 formed in the outer circumferential surface at the same pitch as the openings 12a of the slots 12 in the stator core 10. The first side 41a and the second side 41b of the coil 40 can be inserted into each holding groove 21. The jig 20 can be arranged at the inner side of the stator core 10 with the holding grooves 21 facing the openings 12a of the slots 12. Each holding groove 21 is formed to have a length allowing for the accommodation of one first side 41a and one second side 41b, that is, a total of two straight portions, and a plurality of pushing members 61 forming the pushing unit. Each pushing member 61 is accommodated in the holding groove 21 at the radially inner side (bottom side) of the first side 41a and the second side 41b.

As shown in FIGS. 1 and 2, the support unit 30 is formed to be able to support the stator core 10 with the jig 20 arranged at the radially inner side of the stator core 10. In detail, the support unit 30 is supported by a plurality of (e.g., four) pillars 15 projecting from a base B with the two ends of the support unit 30 fixed at the middle portions of the pillars 15. An accommodation recess 31 allowing for the accommodation of the lower portion of the stator core 10 is formed in the middle of the support unit 30, and a circular opening 31a is formed at the bottom portion of the accommodation recess 31. The diameter of the opening 31a is greater than an inner diameter of the stator core 10. This allows for the pushing members 61 to enter the slots 12 of the stator core 10.

Figure 3A:
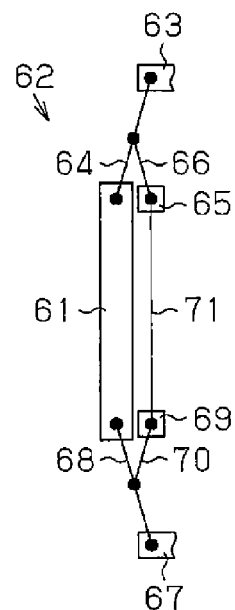
FIG. 3A is a schematic diagram of a link mechanism when a pushing member of FIG. 1 is located at a standby position.
Figure 3B:
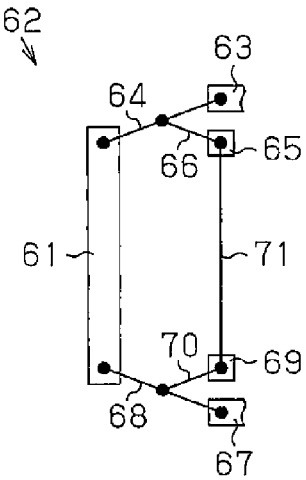
FIG. 3B is a schematic diagram of the link mechanism when the pushing member of FIG. 1 moved to a push-out position.

As shown in FIGS. 5 and 6, the jig 20 includes a plurality of link mechanisms 62. Each link mechanism 62 moves the corresponding pushing member 61 in a direction from the bottom portion of the holding groove 21 toward the corresponding slot 12, and in a direction from the opening of the holding groove 21 toward the bottom portion (direction from the slot 12 toward the bottom portion of the holding groove 21). Each link mechanism 62 includes the pushing member 61 serving as a single node (link). The number of link mechanisms 62 in the jig 20 is equal to the number of the pushing members 61. FIGS. 3A and 3B schematically show a single link mechanism 62. The link mechanism 62 is formed by a six-node link including five links (upper first link 64, upper second link 66, lower first link 68, lower second link 70, fixed node (fixed link) 71) in addition to the pushing member 61.

The upper first link 64 and the upper second link 66 are arranged in an upper portion of the jig 20 in the stator manufacturing device. The upper first link 64 includes a first end pivotally coupled to an upper end of the pushing member 61, and a second end pivotally coupled to a ring-shaped upper drive member 63. The upper second link 66 includes a first end pivotally coupled to a support member 65 fixed to an upper end of the jig 20, and a second end pivotally coupled to an intermediate portion of the upper first link 64. The lower first link 68 and the lower second link 70 are arranged at a lower portion of the jig 20 in the stator manufacturing device. The lower first link 68 includes a first end pivotally coupled to a lower end of the pushing member 61, and a second end pivotally coupled to a ring-shaped lower drive member 67. The lower second link 70 includes a first end pivotally coupled to a support member 69 fixed to a lower end of the jig 20, and a second end pivotally coupled to an intermediate portion of the lower first link 68. The support members 65, 69 and the jig 20 function as a fixed node 71 (fixed link) of the link mechanism 62, and the other links, the pushing member 61, the upper first link 64, the upper second link 66, the lower first link 68, and the lower second link 70 function as movable links. The upper first link 64, the upper second link 66, the lower first link 68, and the lower second link 70 are arranged closer to the axis (radially inner side) of the stator core 10 than the pushing member 61 and at the outer side of the end faces in the axial direction of the stator core 10.

The link mechanism 62 is formed to be vertically symmetric. The pushing member 61 is located at the bottom side of the holding groove 21 when the upper drive member 63 and the lower drive member 67 are arranged at a standby position shown in FIG. 5. From this situation, the pushing member 61 is moved toward the slot 12 when the upper drive member 63 is moved to the lower side and the lower drive member 67 is synchronously moved to the upper side. As shown in FIGS. 3B and 6, when the upper drive member 63 is moved to the lowermost position and the lower drive member 67 is moved to the uppermost position, the pushing member 61 is moved to the frontmost position. The upper drive member 63 and the lower drive member 67 form a drive force applying unit that applies drive force for moving the pushing member 61 from the bottom portion of the holding groove 21 to the slot 12. In other words, the link mechanism 62 includes a drive force applying unit for applying a drive force to the upper and lower sides of the jig 20 (two axial sides of the stator core 10) to move the pushing member 61 from the bottom portion of the holding groove 21 to the slot 12.

The drive unit that lowers the upper drive member 63 is formed by a cylinder 72. As shown in FIGS. 1 and 2, the cylinder 72 is fixed to a support bracket 16 fixed to the upper portions of the pillar 15 with a piston rod 72a projecting toward the lower side at a position corresponding to the center portion of the upper drive member 63. A pushing portion 73 capable of pushing the upper drive member 63 is arranged at a distal end of the piston rod 72a. FIG. 1 shows the piston rod 72a at the most retracted position. In this case, the distance between the lower end of the pushing portion 73 and the upper end of the upper drive member 63 is set so that the stator core 10 does not interfere with the piston rod 72a, the pushing portion 73, and the upper drive member 63 even when the stator core 10 is moved in the horizontal direction. The piston rod 72a extends through a support plate 51a and a turning plate 52a of the pushing unit 50, which will be described later. The pushing portion 73 pushes the upper drive member 63 and lowers the upper drive member 63 during a projecting operation of the cylinder 72.

The drive unit for lifting the lower drive member 67 is also formed by a cylinder 74, as shown in FIGS. 1 and 2. The cylinder 74 is fixed to the base B with a piston rod 74a projecting toward the upper side at a position corresponding to the center portion of the lower drive member 67. The pushing portion 73, which is capable of pushing the lower drive member 67, is arranged at a distal end of the piston rod 74a. The piston rod 74a extends through a support plate 51b and a turning plate 52b of the pushing unit 50, which will be described later. The pushing portion 73 engages the lower drive member 67 and lifts the lower drive member 67 during a projecting operation of the cylinder 74. Unlike the cylinder 72, in the cylinder 74, the piston rod 74a only needs a length allowing for the pushing portion 73 to move the lower drive member 67 to the uppermost position and thus has a shorter stroke than the cylinder 72.

The piston rod 74a of the cylinder 74 is cylindrical. The jig 20 is supported at a predetermined position shown in FIGS. 1 and 2 by a pillar (not shown) extending through the piston rod 74a.

The link mechanism 62 is a structure that uses the biasing force of a torsion spring (not shown) as a drive force that moves the pushing member 61 to the bottom portion of the holding groove 21. The pushing member 61 is moved toward the bottom portion of the holding groove 21 when the piston rod 72a of the cylinder 72 and the piston rod 74a of the cylinder 74 retract.

The pushing unit 50 is formed to be able to simultaneously apply a pushing force to all of the coil ends 42a, 42b from the axial direction of the stator core 10 when the first sides 41a and the second sides 41b are inserted into the holding grooves 21 of the jig 20, which is supported by the support unit 30, and the coil ends 42a, 42b project out of the two end faces in the axial direction of the stator core 10 from the portion of the jig 20 including the holding groove 21.

In the present embodiment, the pushing unit 50 includes the pushing members 53a, 53b, which can also apply pushing force to the coil ends 42a, 42b toward the radially outer side of the stator core. The number of the pushing members 53a, 53b (48 each, 96 in total) is the same as the number of engageable coil ends 42a, 42b of all of the coils 40 set in the jig 20. The pushing unit 50 includes a set of support plates 51a, 51b arranged at each of the upper and lower sides (two axial sides of the stator core 10) of the stator core 10, which is supported by the support unit 30. The turning plate 52a, 52b is supported to be turnable relative to each support plate 51a, 51b at a side of each support plate 51a, 51b opposite to the stator core 10.

As shown in FIGS. 1 and 2, the upper support plate 51a is supported to be able to move upward and downward relative to the pillars 15 between the support unit 30 and the support bracket 16. The upper support plate 51a on the upper side is fixed to a lifting support body 55a that can be lifted and lowered by a ball screw mechanism 54a arranged between the support unit 30 and the support bracket 16. The ball screw mechanism 54a lowers the lifting support body 55a when rotated in a forward direction by the motor 56a, and lifts the lifting support body 55a when rotated in a reverse direction by the motor 56a. The lower support plate 51b is supported to be able to move upward and downward relative to the pillars 15 between the base B and the support unit 30. The lower support plate 51b is fixed to a lifting support body 55b that can be lifted and lowered by a ball screw mechanism 54b arranged between the base B and the support unit 30. The ball screw mechanism 54b lifts the lifting support body 55b when rotated in a forward direction by the motor 56b, and lowers the lifting support body 55b when rotated in a reverse direction by the motor 56b.

The pushing unit 50 is formed so that one of the support plates 51a, 51b, namely, the upper support plate 51a in the present embodiment, is movable with the turning plate 52a and the pushing members 53a to a position for supporting the stator core 10 with the support unit 30 and to a position (standby position shown in FIG. 1) where the stator core 10 can be removed from the support unit 30 without any obstacles. Thus, the distance between the support unit 30 and the support bracket 16 is set to be greater than the distance between the base B and the support unit 30, and the lengths of the ball screw mechanisms 54a, 54b differ accordingly.

As shown in FIGS. 1 and 2, a gear portion 57 is formed on the outer circumferential surface of each turning plate 52a, 52b. Each gear portion 57 is engaged with a gear 59 driven by a motor 58a or 58b. A motor capable of producing forward and reverse rotation is used for each motor 58a, 58b. The turning plates 52a, 52b are turned in a first direction when the motors 58a, 58b produce forward rotation, and are turned in a second direction when the motors 58a, 58b produce reverse rotation. In FIGS. 5 and 6, the gear portions 57 are not shown.

As shown in FIGS. 5 and 6, each support plate 51a, 51b has straight guide grooves 51c extending parallel to and in correspondence with the slot 12 of the stator core 10. The straight guide grooves 51c are formed to extend in a radial direction. Each turning plate 52a, 52b includes a spiral guide groove 52c. Each pushing member 53a, 53b includes a portion 53c, which is movable in the straight guide groove 51c, and an engagement portion 53d, which engages with the spiral guide groove 52c. Each pushing member 53a, 53b moves toward the outer side of the support plate 51a, 51b along the straight guide groove 51c when the turning plate 52a, 52b is turned in the first direction, and moves toward the inner side of the support plate 51a, 51b along the straight guide groove 51c when the turning plate 52a, 52b is turned in the second direction.

The manufacturing method of the stator using the manufacturing device will now be described.

First, as shown in FIG. 1, the upper support plate 51a is arranged at the standby position together with the turning plate 52a and the pushing member 53a. The coils 40 are set in the jig 20, which is supported by the support unit 30, without the stator core 10 being supported by the support unit 30.

As shown in FIG. 7, each of the coils 40 is attached to the jig 20 with the first side 41a located close to the opening of the holding groove 21 and the second side 41b located at the bottom side (far side) of the holding groove 21. Each coil 40 is arranged so that five holding grooves 21 are present between the first side 41a and the second side 41b, that is, in a state in which the coil pitch is six, and with each holding groove 21 receiving one of first side 41a and one second side 41b. FIG. 7 shows the stator core 10 arranged at the outer side of the jig 20. After setting the coils 40 to the jig 20, when the stator core 10 is attached to and supported by the support unit 30, the jig 20 is arranged at the inner side of the stator core 10 with the holding grooves 21 facing the openings 12a of the slots 12, as shown in FIG. 7. In this state, each coil 40 is set so that the coil ends 42a, 42b (not shown) projects out of the two ends of the corresponding holding grooves 21, that is, the coil ends project outward in the axial direction of the stator core 10 from the two end faces of the portion of the jig 20 that includes the holding grooves 21. The stator core 10, the jig 20, the pushing unit 50, and the link mechanisms 62 are in a positional relationship shown in FIG. 1.

Next, the ball screw mechanism 54a is driven to lower the lifting support body 55a to a position symmetric with the lifting support body 55b relative to the link mechanisms 62 thereby shifting to the state shown in FIG. 2. The coils 40 are not shown in FIGS. 1 and 2. However, when the coils 40 are set in the jig 20 and the lifting support body 55a is arranged at the position shown in FIG. 2, the positional relationship of the coils 40, the link mechanisms 62, the pushing members 61, and the pushing units 50 is as shown in FIG. 5. In other words, the pushing members 61 are arranged at the standby position on the bottom side of the holding grooves 21, each upper end of the upper first links 64 and the upper second links 66 is arranged at a farthermost position from the upper surface of the jig 20, and each lower end of the lower first links 68 and the lower second links 70 is arranged at a farthermost position from the lower surface of the jig 20.

Under this situation, the motors 56a, 56b are synchronously driven to produce forward rotation so that the upper lifting support body 55a is lowered and the lower lifting support body 55b is lifted. As a result, the pushing force that squeezes the coils 40 in the axial direction, that is, the pushing force that increases the distance between the first side 41a and the second side 41b in each coil 40 is applied to the coil ends 42a, 42b, to which the pushing members 53a, 53b are engaged. The motors 58a, 58b are further synchronously driven to produce forward rotation driven with the motors 56a, 56b so that the turning plates 52a, 52b are turned in the first direction, and the pushing members 53a, 53b are moved toward the outer side of the turning plates 52a, 52b in the radial direction of the turning plates 52a, 52b. As a result, the pushing members 53a, 53b apply a pushing force to the coil ends 42a, 42b directed toward the outer side of the stator core 10 and a pushing force in a direction for squeezing the coils 40 in the axial direction of the stator core 10.

Figure 8:
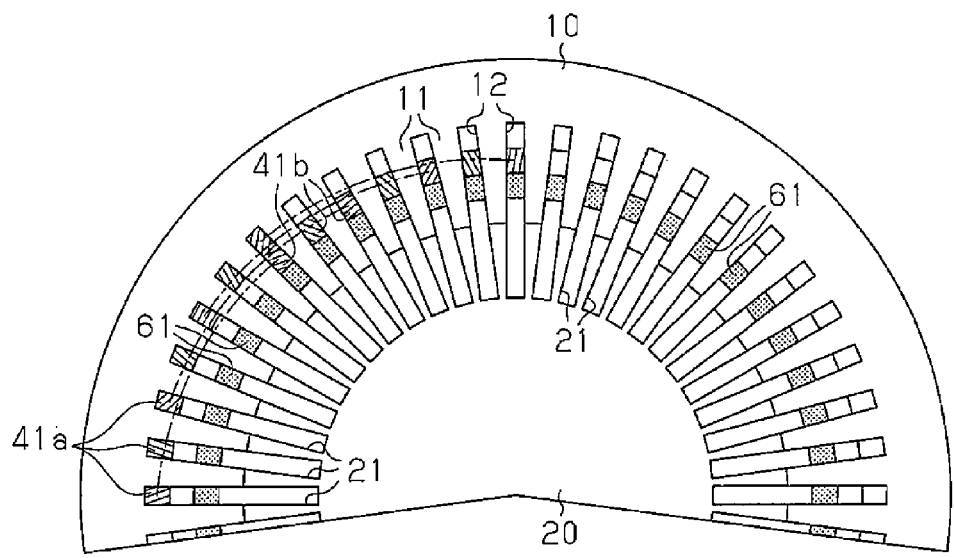
FIG. 8 is a schematic plan view showing the coil of FIG. 7 pushed into the slots.
Figure 9:
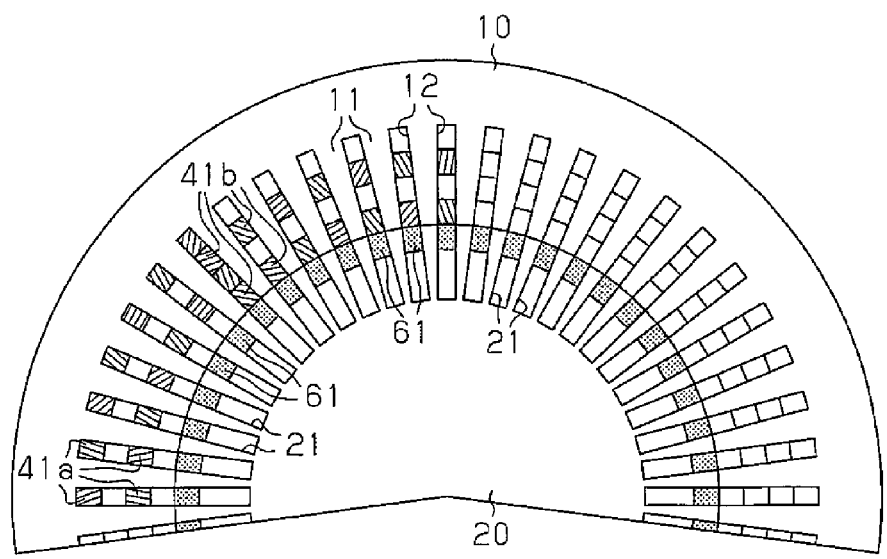
FIG. 9 is a schematic plan view showing when the second insertion and coupling of the coil are completed.

When the cylinders 72, 74 of the pushing unit are driven and projected in synchronism with the driving of the motors 56a, 56b and the motors 58a, 58b, the upper drive member 63 and the lower drive member 67 are synchronously moved toward each other. As a result, each pushing member 61 is moved from the bottom portion of each holding groove 21 toward the slot 12, and the first side 41a and the second side 41b are pushed out of the holding groove 21 and into the slot 12. When the upper drive member 63 is moved to the lowermost position and the lower drive member 67 is moved to the uppermost position, the first side 41a and the second side 41b are moved to the bottom of the slot 12, as shown in FIGS. 6 and 8.

The slot pitch of the stator core 10 is most narrow (small) at the location of the openings 12a of the slots 12 and the most wide (large) at the bottom portion of the slot 12, and the holding grooves 21 of the jig 20 are also formed to extend on extended lines of the slot 12. Thus, when a force in the radial direction is applied from the axis of the stator core 10 to the coils 40, each coil 40 needs to be moved while changing the distance between the first side 41a and the second side 41b. In this case, the force for increasing the distance between the first side 41a and the second side 41b of the coil 40 is applied to the first side 41a and the second side 41b from the wall surfaces of the slot 12 and the holding groove 21, and the reaction force is applied from the first side 41a and the second side 41b to the wall surface of the holding groove 21 or the slot 12. A large force is used to increase the distance between the first side 41*a* and the second side 41*b*. Thus, when the first side 41*a* and the second side 41*b* move with a large force applied to the first sides 41*a* and the second sides 41*b* and the wall surfaces of the slots 12 and the holding grooves 21, the wall surfaces of the slots 12 and the holding grooves 21 may be deformed or damaged. Further, the insulation coating may be removed from the coils 40.

However, in the present embodiment, the coils 40 are moved toward the bottom portions of the slots 12 by the pushing members 61 of the pushing unit while increasing the distance between the first side 41*a* and the second side 41*b* of each coil 40 with the pushing force applied by the pushing members 53*a*, 53*b* of the pushing unit 50. This smoothly moves the first side 41*a* and the second side 41*b* in the extending direction of the slot 12. Therefore, even when deforming and inserting the coils 40, which need a large force to be deformed when the coils 40 are formed by rectangular wires, into the slot 12 of the stator core 10, the deformation and damage of the stator core 10 and removal of the insulation coating from the coils 40 are obviated.

The motors 56*a*, 56*b* and the motors 58*a*, 58*b* are then synchronously driven to produce reverse rotation so that the lifting support body 55*a* is lifted and the lifting support body 55*b* is lowered. The turning plates 52*a*, 52*b* are turned in the second direction, and the pushing members 53*a*, 53*b* are moved toward the inner side of the turning plates 52*a*, 52*b* in the radial direction of the turning plates 52*a*, 52*b*. As a result, the coil ends 42*a*, 42*b* are disengaged from the pushing members 53*a*, 53*b*. Furthermore, the cylinders 72, 74 stop supplying the drive force for moving the upper drive member 63 and the lower drive member 67 toward each other. Each pushing member 61 is consequently moved to the standby position at the bottom side of the holding groove 21 by the biasing force of the torsion spring. This completes the first operation for coupling the coils 40 to the stator core 10.

Figure 10:
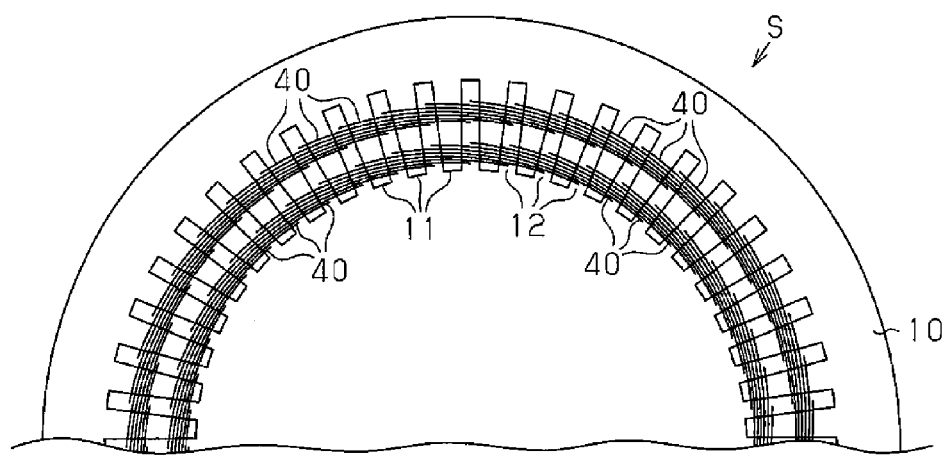
FIG. 10 is a schematic diagram showing wound coils.

In the present embodiment, the coils 40 are coupled to the stator core 10 in double layer winding and in duplex winding, as shown in FIG. 10. In other words, the coil 40 of double layer winding, in which one of each of the first side 41*a* and the second side 41*b* is inserted to each slot 12 of the stator core 10, is coupled twice to the stator core 10. Thus, the coupling of the coil 40 is performed twice. After the first operation for coupling the coils 40 is completed, the coils 40 are set in the jig 20, which is supported by the support unit 30, without the stator core 10 being supported by the support unit 30 in the same manner as the first coupling operation of the coils 40. After the coils 40 are set in the jig 20, the stator core 10 that has undergone the first coupling of the coils 40 is supported by the support unit 30. As a result, the jig 20 in which the coils 40 are set is arranged at a coil pitch of six with one first side 41*a* and one second side 41*b* inserted into each holding groove 21 at the inner side of the stator core 10 in which the coils 40 are coupled in the double layer winding at the far side of the slots 12.

Then, in the same manner as the first coupling operation of the coils 40, the motors 56*a*, 56*b* are synchronously driven to produce forward rotation, the motors 58*a*, 58*b* are driven to produce forward rotation in synchronism with the motors 56*a*, 56*b*, and the cylinders 72, 74 of the pushing unit are driven to perform a projecting operation in synchronism with the driving of the motors 56*a*, 56*b* and the motors 58*a*, 58*b*. Then, the pushing members 61 are moved from the bottom portions of the holding groove 21 toward the slots 12, and the first side 41*a* and the second side 41*b* is pushed out of each holding groove 21 and into the slot 12 thereby shifting to the state shown in FIG. 9. The second time differs from the first time in that each pushing member 61 is not moved into the slot 12 but is moved to the end of the opening of the holding groove 21 so that two first sides 41*a* and two second sides 41*b* are inserted into each slot 12. Then, the motors 56*a*, 56*b* and the motors 58*a*, 58*b* are driven to produce reverse rotation, the upper drive member 63 and the lower drive member 67 are returned to the positions shown in FIG. 1, the cylinders 72, 74 are driven to perform a retraction position, and the link mechanisms 62 move the pushing members 61 to the standby position at the bottom side of the holding groove 21 with the biasing force of the torsion spring. This completes the second operation for coupling the coils 40 to the stator core 10. Subsequently, the upper support plate 51*a*, turning plate 52*a*, and pushing member 53*a* are moved to positions where the stator core 10 may be removed from the support unit 30 without any obstacles. Then, the stator core 10 in which the coils 40 are inserted at predetermined positions in the slots 12 are removed from the support unit 30. The ends of the winding wire 40*a* of each coil 40 are then connected. As shown in FIG. 10, this completes a stator S in which the coils 40 are coupled to the stator core 10 in double layer windings and duplex windings. FIG. 10 shows one-half of the stator S.

The present embodiment has the advantages described below.

(1) In the manufacturing method of the stator of the rotating electrical machine, the plurality of holding grooves 21, into which the straight portions (first side 41*a* and second side 41*b*) of the coil 40 are insertable, are formed at the same pitch as the openings 12*a* of the slot 12. Further, the jig 20 that is used is arrangeable at the inner side of the stator core 10 with the holding grooves 21 facing the openings 12*a* of the slots 12. The stator core 10 is annular. The slots 12 each have an opening 12*a* that opens in the inner circumference of the stator core 10. The slots 12 are formed so that the slot pitch increases from the opening 12*a* toward the bottom portion. The coils 40 are then set so that the straight portions are inserted into the holding grooves 21 of the jig 20 and the coil ends 42*a*, 42*b* project out of the end faces in the axial direction of the stator core 10 from the portion of the jig 20 including the holding grooves 21. In the holding groove 21 that receives the straight portion, the pushing member 61 is located closer to the bottom of the holding groove 21 than the straight portion. Further, the pushing unit 50 simultaneously applies a pushing force in the axial direction of the stator core 10 to all of the coil ends 42*a*, 42*b* of the coils 40. This increases the distance between the adjacent straight portions of the coil 40. Further, the pushing unit, which moves all of the pushing members 61 along the holding grooves 21, simultaneously applies force, with the link mechanisms 62, to the coils 40 in order to push the straight portions out of the holding grooves 21 and into the corresponding slots 12. Therefore, even when deforming and inserting the coils 40, which needs a large force for deformation when the coils 40 are formed by rectangular wires, into the slots 12 of the stator core 10, deformation and damage of the stator core 10 and the coil 40 are obviated. Removal of the insulation coating from the coils 40 is also obviated. Compared to when dividing the coils 40 set in the jig 20 into a plurality of groups and sequentially moving the groups of coils 40, by simultaneously moving the coils, the insertion time for moving (inserting) the coils 40 into the slots 12 of the stator core 10 may be drastically shortened (e.g., by about 1/10).

(2) The strength of the jig 20 may be reduced since an excessively large force is not applied when deforming the coils 40 to the jig 20, specifically, the wall surfaces of the holding grooves 21. This increases the freedom of design for the motor because if the diameter of the motor in which the stator is used is small or the amount of coils is large, the thickness decreases between the adjacent holding grooves 21 of the jig 20 and lowers the strength. Thus, the motor would have to be designed taking this into consideration. However, when an excessively large force is not applied to the wall surfaces of the holding groove 21, there is no need for such considerations.

(3) The coils 40 that are used are each ring-shaped and includes two straight portions (first side 41a and second side 41b) and two coil ends 42a, 42b. Therefore, the coil is suitable for the manufacturing of the stator in which the coils 40 is coupled to the stator core 10 in distributed windings.

(4) Rectangular wires are used for the winding wires 40a that form the coils 40. Therefore, the occupying rate of the coil 40 is increased compared to when the winding wire 40a has a circular cross-section or an elliptical cross-section.

(5) The coil 40 has two coil ends 42a, 42b having projecting shapes. For example, the coil 40 may be formed such that the distance between the first side 41a and the second side 41b increases even if the pushing unit 50 applies a pushing force in the axial direction of the stator core 10 to each of the coil ends 42a, 42b of the coil 40 when only the coil end 42a is formed to have a projecting shape. However, when both coil ends have a projecting shape, the coil is easily deformed to increase the distance between the first side 41a and the second side 41b while keeping the first side 41a and the second side 41b parallel.

(6) The stator manufacturing device of the rotating electrical machine includes the support unit 30 for supporting the stator core 10 and the jig 20, which is arranged on the inner side of the stator core 10, in a concentric state. The jig 20 has a plurality of holding grooves 21, to which the straight portions (first side 41a and second side 41b) of the coil 40 can be inserted, formed at the same pitch as the openings 12a of the slots 12 of the stator core 10, and arrangeable at the inner side of the stator core 10 with the holding grooves 21 facing the openings 12a of the slots 12. The manufacturing device further includes the link mechanisms 62 and the pushing units 50. The link mechanisms 62 are arranged in the jig 20, and includes the pushing members 61, which are arrangeable closer to the bottom of the holding grooves 21 than the straight portions inserted in the holding grooves 21, and the links, which are arranged closer to the axis of the stator core 10 than the pushing members 61 at the outer side of the end face in the axial direction of the stator core 10 and which moves all of the pushing members 61 in a direction from the bottom portion of the holding groove 21 toward the corresponding slot 12 and in a direction from the slot 12 toward the bottom portion of the holding groove 21. The pushing unit 50 simultaneously applies pushing force in the axial direction of the stator core 10 to all of the coil ends 42a, 42b with the straight portions inserted into the holding grooves 21 of the jig 20, which is supported by the support unit 30, and the coil ends 42a, 42b projecting outward in the axial direction of the stator core 10 from the two end faces of the portion of the jig 20 including the holding grooves 21. The coils 40 incorporated in the stator core 10 using the manufacturing device are moved toward the bottom portions of the slots 12 by the pushing members 61 while increasing the distance between the straight portions of the coils 40 with the pushing force applied by the pushing unit 50. Therefore, even when deforming and inserting the coils 40, which needs a large force for the deformation when the coils 40 are formed by rectangular wires, into the slot 12 of the stator core 10, the deformation and damage of the stator core 10 and the coil 40 are obviated. Furthermore, removal of the insulation coating from the coils 40 is obviated.

(7) The pushing unit 50 includes the pushing members 53a, 53b also capable of applying pushing force directed toward the outer side of the stator core 10 to the coil ends 42a, 42b. The pushing members 53a, 53b are provided for each of the coil ends 42a, 42b. In other words, the pushing unit 50 also applies pushing force toward the outer side of the stator core 10 to the coil ends 42a, 42b. Thus, the straight portions (first side 41a and second side 41b) of the coils 40 receive force that moves the straight portions toward the bottom portion of the slot 12 from both of the pushing member 61 and the pushing unit 50 so as to be pushed out of the holding groove 21 into the corresponding slot 12. This further smoothly moves the straight portions.

(8) The pushing unit 50 includes the set of support plates 51a, 51b arranged at the two axial sides of the stator core 10 with the stator core 10 supported by the support unit 30 in between, and the turning plates 52a, 52b supported to be turnable at the side of each support plate 51a, 51b opposite to the stator core 10. The support plates 51a, 51b include the straight guide grooves 51c extending parallel to the slots 12 of the stator core 10 and in correspondence with the slots 12. The turning plates 52a, 52b each include the spiral guide groove 52c. The pushing members 53a, 53b include the portion 53c, which is movable along the straight guide groove 51c, and the engagement portion 53d, which engages the spiral guide groove 52c. Therefore, a mechanism for applying moving force to the pushing members 53a, 53b is simplified even if there are a large number of the pushing members 53a, 53b.

(9) The pushing unit 50 is formed such that one of the support plates 51a, 51b, namely, the upper support plate 51a, can move the stator core 10 to the position where the stator core 10 is supported by the support unit 30 or to the position where the stator core 10 is removed from the position supported by the support unit 30 without any obstacles from the turning plate 52a and the pushing member 53a. Therefore, the area occupied by the device is reduced compared to a structure in which the set of support plates forming the pushing unit both move the stator core 10 to a position where the stator core 10 is supported by the support unit 30 or to a position where the stator core 10 is removed from the position supported by the support unit 30 without any obstacles from the turning plates 52a, 52b and the pushing members 53a, 53b.

(10) The link mechanism 62 includes the drive force applying unit (upper drive member 63 and lower drive member 67) that applies drive force for moving at least the pushing members 61 from the bottom sides of the holding grooves 21 toward the slots 12 at both axial sides of the stator core 10 with the jig 20 arranged in between. Therefore, the drive force applied by one drive force applying unit is small and the force is easily and evenly applied to each node (link) of the link mechanism 62 compared to a structure in which the drive force applying unit that applies the drive force for moving the pushing members 61 from the bottom portions of the holding grooves 21 to the slots 12 is arranged at one side with a jig arranged in between.

(11) Each link mechanism 62 uses the biasing force of the torsion spring as a drive force for moving the pushing member 61 to the bottom portion of the holding groove 21. Therefore, the link mechanism 62 does not move even if the piston rod 72a of the cylinder 72, which applies the drive force to the upper drive member 63, is moved to a position that does not obstruct the attachment and removal of the stator core 10 to and from the support unit 30. Thus, the structure for holding the pushing member 61 at the standby position in the bottom portion of the holding groove 21 is simplified even when the upper drive member 63, which is the drive force applying unit for driving the link mechanism 62, is disengaged from the piston rod 72*a*.

(12) The lifting support bodies 55*a*, 55*b* of the pushing units 50 are driven by the ball screw mechanisms 54*a*, 54*b*, which are driven by the motors 56*a*, 56*b*. Therefore, the lifting support bodies 55*a*, 55*b* are easily driven at an appropriate speed and timing even regardless of whether only one lifting support body 55*a* is lifted or both lifting support bodies 55*a*, 55*b* are lifted in synchronization.

Second Embodiment

A second embodiment will now be described with reference to FIGS. 11 and 12. In the present embodiment, the supporting structure of the stator core 10 and the supporting structure of the jig 20 differ from the first embodiment. Portions that are the same as the first embodiment are denoted with the same reference characters and will not be described in detail.

In the first embodiment, the stator core 10 is supported by the support unit 30 while being accommodated in the accommodation recess 31 formed in the support unit 30, which is fixed at a predetermined position. The center position of the accommodation recess 31 is constantly fixed at a position coaxial with the pushing portions 73 of the upper and lower pushing units 50. A pillar (not shown) extends through the piston rod 74*a* of the lower cylinder 74 to support the jig 20 at a predetermined position shown in FIGS. 1 and 2. The jig 20 extends through the accommodation recess 31 of the support unit 30 together with the link mechanisms 62. As shown in FIG. 1, the stator core 10 is removed from the accommodation recess 31 and arranged in the accommodation recess 31 of the stator core 10 by lifting the lifting support body 55*a* to a position where removal of the stator core 10 is not obstructed by the upper pushing unit 50.

The support unit 30 is not fixed at a predetermined position in the present embodiment. Specifically, the support unit 30 is formed to be horizontally movable to a standby position and a coil inserting position. At the standby position, the stator core 10 is arranged in the accommodation recess 31 of the stator core 10 or removed from the accommodation recess 31. At the coil inserting position, the center position of the accommodation recess 31 is coaxial with the pushing portions 73 of the upper and lower pushing units 50 so that the coils 40 can be inserted to the stator core 10.

Figure 11:
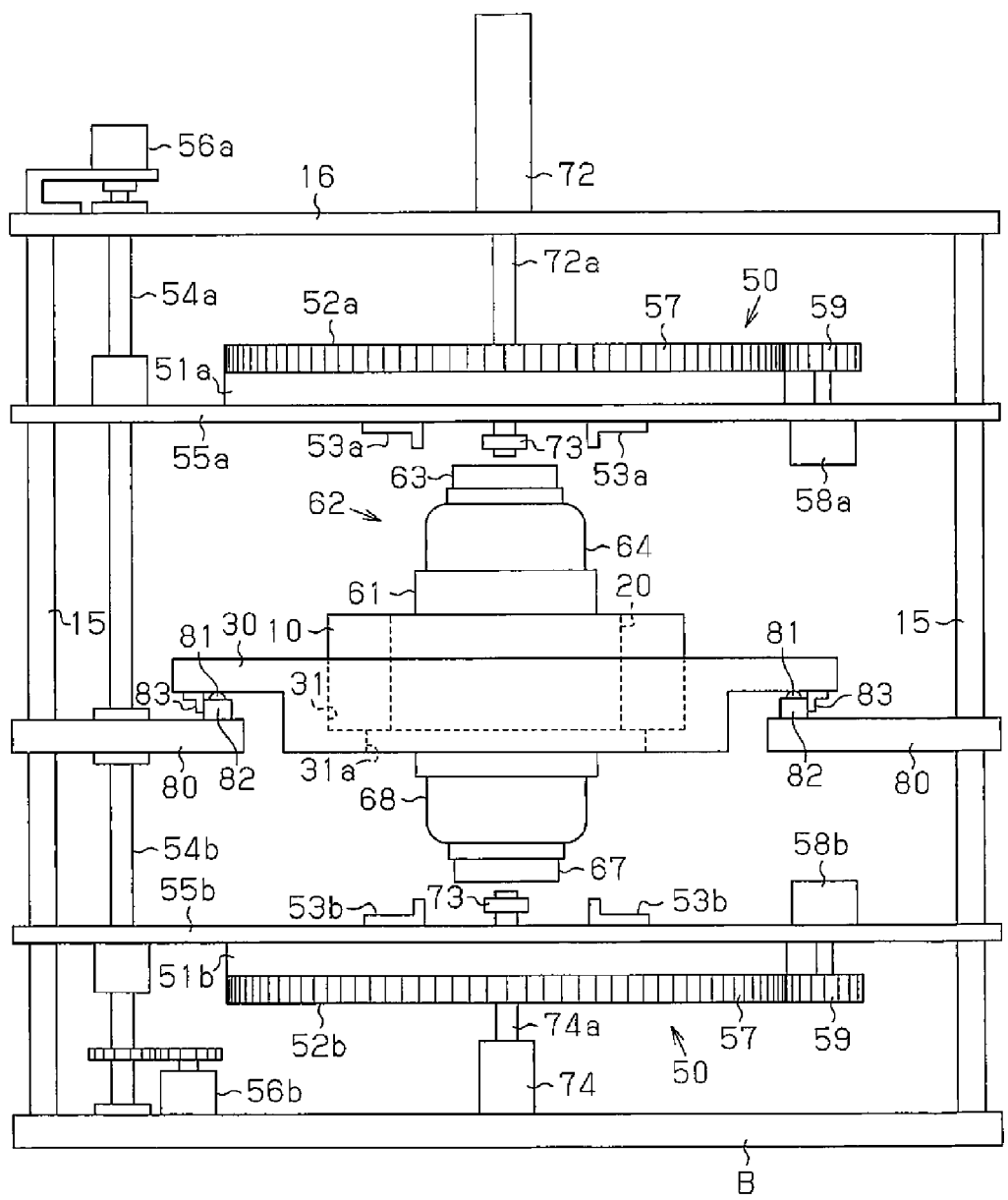
FIG. 11 is a schematic front view entirely showing a stator manufacturing device according to a second embodiment of the present invention.
Figure 12:
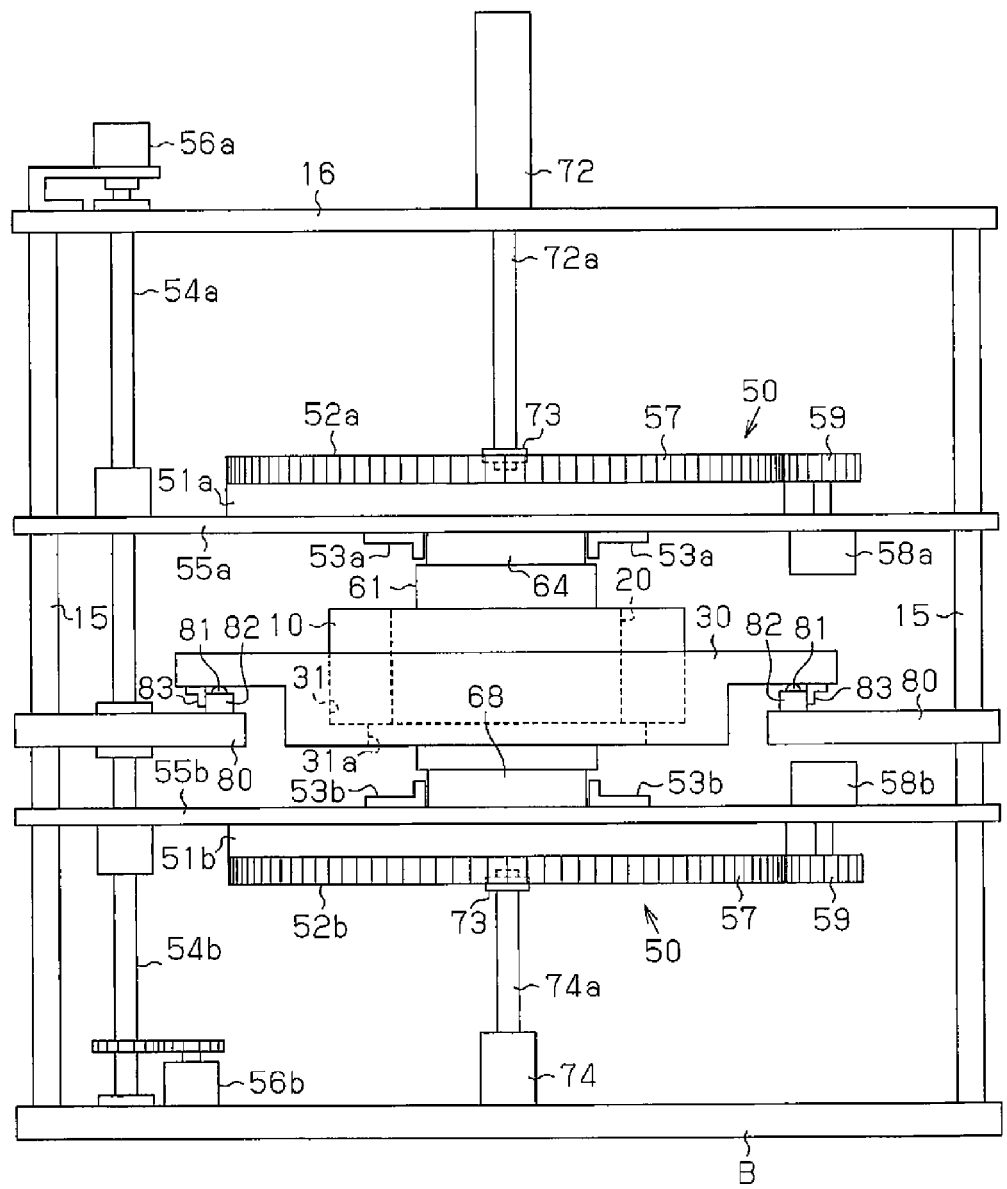
FIG. 12 is a schematic front view entirely shows the stator manufacturing device of FIG. 11.

In detail, as shown in FIGS. 11 and 12, left and right support frames 80 are arranged on the pillars 15. A plurality of spherical rollers 81 are arranged on each of the two support frames 80 along a single straight line. The spherical rollers 81 are arranged in a single row in a direction perpendicular to the plane of FIGS. 11 and 12. The support unit 30 is supported on the support frames 80 by the spherical rollers 81. A guide bar 83, which is engageable with a support body 82 of the spherical roller 81, is fixed to the lower surface at the left and right sides of the support unit 30 and extending in the direction perpendicular to the plane of FIGS. 11 and 12. The support unit 30 is horizontally movable in the direction perpendicular to the plane of drawing of FIGS. 11 and 12 under a situation in which the support unit 30 is supported by the spherical rollers 81 and in which the guide bars 83 are engaged with the side surfaces of the support bodies 82. The support unit 30 is stopped by a stopper (not shown) when located at the standby position and the coil inserting position. The support unit 30 is manually moved.

The ball screw mechanism 54*a* for lifting and lowering the upper lifting support body 55*a* is arranged between the support frame 80 and the support bracket 16. The ball screw mechanism 54*b* for lifting and lowering the lower lifting support body 55*b* is arranged between the base B and the support frame 80.

Furthermore, an engagement portion (not shown), which is engageable with the upper portions of the tips of the teeth 11 of the stator core 10, is arranged at the upper part of the jig 20. The jig 20 is supported by the stator core 10 when the engagement portion is engaged with the upper portions of the tips of the teeth 11. Thus, there is no need for the pillar (not shown) used in the first embodiment that extends through the piston rod 74*a* of the lower cylinder 74.

FIG. 11 shows the lifting support bodies 55*a*, 55*b* arranged so that the link mechanisms 62 and the pushing units 50 are not obstacles when the support unit 30 supporting the stator core 10 is horizontally moved between the standby position and the coil inserting position with the jig 20 supported by the stator core 10 together with the link mechanisms 62. If the jig 20 is moved toward the upper side when the support unit 30 located at the standby position, the jig 20 is disengaged from the stator core 10 and removed from the stator core 10 together with the link mechanisms 62. The stator core 10 is then removed from the accommodation recess 31.

In the first embodiment, the support unit 30 for supporting the stator core 10 is fixed at a predetermined position facing the pushing unit 50, and the jig 20 is supported at a predetermined position when extended through the stator core 10 together with the link mechanisms 62. Thus, in order to remove the stator core 10 from the support unit 30, space is needed to move the lower surface of the stator core 10 in the vertical direction to a position higher than the upper end of the link mechanisms 62 so as not to interfere with at least the link mechanisms 62 and then move the stator core 10 in the horizontal direction. This requires a long lifting distance for the upper lifting support body 55*a* and increases the height of the stator core manufacturing device. Further, the piston rod 72*a* of the cylinder 72 for lowering the upper drive member 63 has to be projected and retracted over a long distance. Compared to the first embodiment, the present embodiment allows for the distance over which the upper lifting support body 55*a* is lifted and lowered to be shortened. Thus, the height of the stator core manufacturing device core can be decreased, and the piston rod 72*a* of the cylinder 72 may be projected and retracted over a short distance.

Further, in the first embodiment, the operation for setting the coils 40 in the jig 20 is performed when the jig 20 is extended through the accommodation recess 31. Thus, the setting operation is difficult to perform due to the presence of the upper lifting support body 55*a*, the pushing members 53*a*, and the like. In the present embodiment, however, the operation for setting the coils 40 in the jig 20 is performed when the support unit 30 is arranged at the standby position but the jig 20 and the stator core 10 are removed. This enlarges the operation space and allows for tasks to be easily performed.

Embodiments are not limited to the foregoing description and may be modified, for example, as described below.

Figure 13:
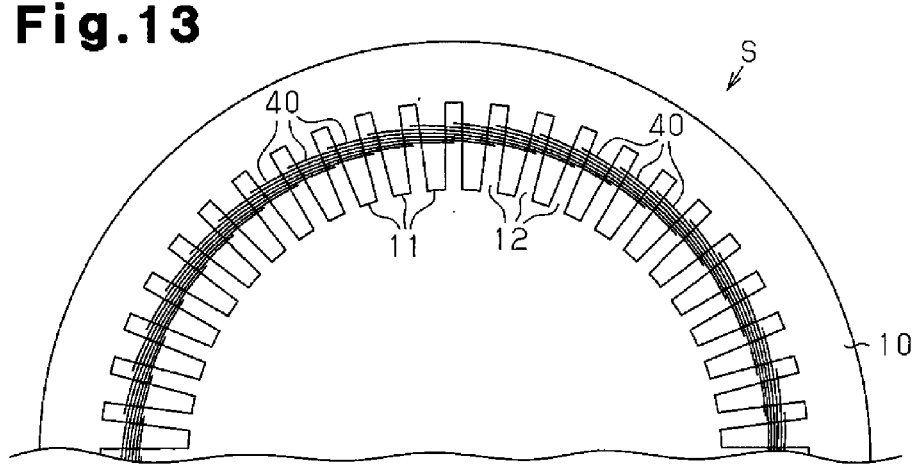
FIG. 13 is a schematic diagram showing wound coils in a further embodiment.
Figure 14:
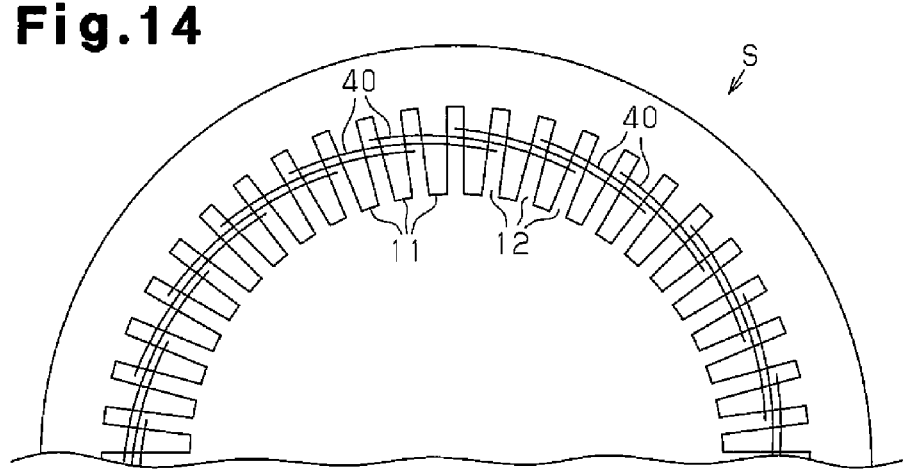
FIG. 14 is a schematic diagram showing wound coils in a further embodiment.

The winding method of the coil 40 is not limited to double layer winding in which each of the two layer windings includes one first side 41*a* and one second side 41*b* that are inserted into each slot 12 of the stator core 10. For example, as shown in FIG. 13, a method in which the coil 40 is incorporated in the stator core 10 in double layer winding and in single winding may be adopted. Moreover, a method in which the coil 40 is incorporated in the stator core 10 in one layer winding (single layer wound), in which one first side 41*a* or one second side 41*b* is inserted into one slot 12 in a single winding, as shown in FIG. 14.

Figure 15:
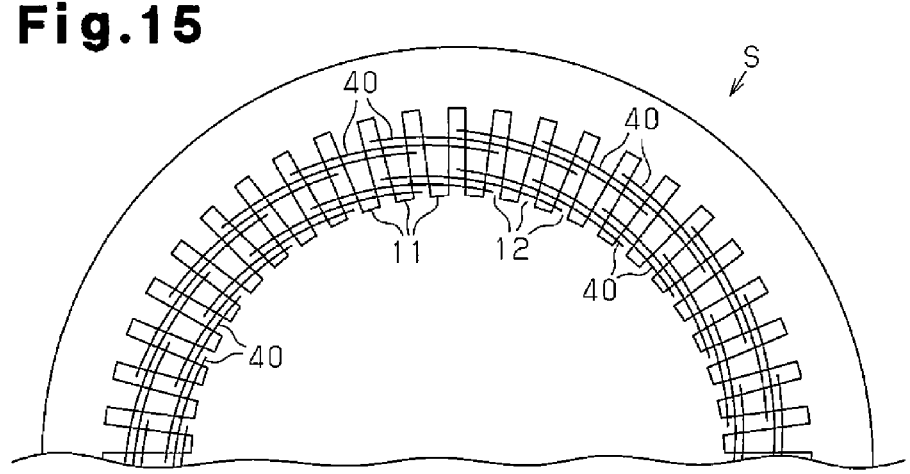
FIG. 15 is a schematic diagram showing wound coils in a further embodiment.

Alternatively, a method in which the coil 40 is incorporated in the stator core 10 in one layer winding and in duplex winding, as shown in FIG. 15, may be adopted. For the double layer winding, five slots 12 are present between the slots 12 that receive the first side 41*a* and the second side 41*b* of one coil 40. For a one layer winding (single layer winding), four slots 12 are present between the slots 12 that receive the first side 41*a* and the second side 41*b* of one coil 40.

The number of slots 12 existing between the first side 41*a* and the second side 41*b* of one coil 40 is not limited to four or five. For example, the number may be less than four, such as three, or greater than five, such as six.

The drive force applying unit for lifting and lowering the lifting support bodies 55*a*, 55*b* of the pushing units 50 is not limited to the ball screw mechanisms 54*a*, 54*b* driven by the motors 56*a*, 56*b*, and may be formed by hydraulic cylinders, pneumatic cylinders, or electric cylinders.

The pushing units 50 and the link mechanisms 62 may share the same drive source. For example, as shown in FIGS. 16A and 16B, the pushing member 53*a*, 53*b* may be formed to allow for contact with the pushing members 61 and the bottom surfaces of the holding grooves 21. When the support plate 51*a* and the turning plate 52*a* are lowered and the support plate 51*b* and the turning plate 52*b* are lifted, each pushing member 61 is moved toward the outer side, that is, away from the bottom portion of the holding groove 21 by the outward movement of the pushing member 53*a*, 53*b*. In this case, the upper drive member 63 and the lower drive member 67, which serve as the drive force applying unit for the link mechanism 62, and the cylinders 72, 74, which form the drive unit, are not necessary, and the structure of the link mechanisms is simplified. Furthermore, the cylinder 74 is unnecessary. This increases the degree of freedom for the structure of the support unit supporting the jig 20. For example, the pillar for supporting the jig 20 may be arranged at the position where the cylinder 74 was arranged.

The pushing unit 50 only needs to have a structure in which a pushing force is simultaneously applied to all of the coil ends 42*a*, 42*b* of the coils 40 from the axial direction of the stator core 10 in synchronism with the link mechanisms set in the holding grooves 21 to widen the distance between the first side 41*a* and the second side 41*b*. For example, instead of the pushing members 53*a*, 53*b* that applying a pushing force to the coil ends 42*a*, 42*b* toward the outer side of the stator core 10, a pair of pushing bodies (pushing plates) may simultaneously contact the coil ends 42*a*, 42*b* to apply only pushing force in the axial direction of the stator core 10.

The ball screw mechanism may be arranged in lieu of the cylinders 72, 74 for supplying drive force to the upper drive member 63 and the lower drive member 67 of the link mechanisms 62 that drive the pushing unit. However, the cylinders 72, 74 allows for a more simple structure than a ball screw mechanism.

The coil 40 may be deformable such that the distance between the first side 41*a* and the second side 41*b* of the coil 40 increases when the pushing force is applied from the axial direction of the stator core 10 to both coil ends 42*a*, 42*b* by the pushing unit 50. In other words, the coil ends 42*a*, 42*b* do not need to have a projecting shape. For example, a coil 40 in which only one of the coil ends 42*a*, 42*b* has a projecting shape may be adopted. However, the coil 40 in which both coil ends 42*a*, 42*b* have a projecting shape is preferable since the distance between the first side 41*a* and the second side 41*b* can be smoothly and easily increased when the pushing force is applied by the pushing unit 50.

The projecting shape of the coil ends 42*a*, 42*b* is not limited to a mountain shape. For example, the coil ends 42*a*, 42*b* may be formed to a semi-elliptical shape, or may be formed to a shape having an inclined portion continuous with the first side 41*a* and the second side 41*b* on two sides of the horizontally extending distal ends.

As a structure for supporting the jig 20 at a predetermined position on the inner side of the stator core 10, the upper portion of the jig 20 is formed to have a larger diameter than the inner diameter of the stator core 10, and the engagement portion is engaged with the upper portions of the tips of the teeth 11 of the stator core 10. The jig 20 may be supported by the stator core 10 by engaging the engagement portion with the upper portions of the tips of the tooth 11. In this case, the radial length of the slot 12 is longer than the sum of the radial length occupied by the first side 41*a* and the second side 41*b* accommodated in each slot 12 and the radial length of the engagement portion. When removing the stator core 10 from the support unit 30 after coupling the coils 40 to the stator core 10, the engagement portion is positioned in the slots 12 of the stator core 10. The stator 10 can be moved upward in the axial direction in this state. This allows for the stator 10 to be removed without any obstacles.

The winding wire 40*a* forming the coil 40 is not limited to a rectangular wire. In other words, the winding wire 40*a* only needs to be deformable such that the distance between the first side 41*a* and the second side 41*b* of the coil 40 increases when the pushing unit 50 simultaneously applies a pushing force to every coil end from the axial direction of the stator core 10. For example, the winding wire may have with an elliptical or a circular cross-section having a thickness that can be deformed such that the distance between the first side 41*a* and the second side 41*b* of the coil 40 increases when pushing force is simultaneously applied to the coils ends from the axial direction of the stator core 10. A winding wire may include a plurality of thin winding wires that do not deform such that the distance between the first side 41*a* and the second side 41*b* increases but deforms such that the coil ends are squeezed when the pushing force is simultaneously applied to the coil ends from the axial direction of the stator core 10. The thin winding wires may be bundled and fixed with resin and the like.

Each lifting support body 55*a*, 55*b* may be formed to be driven with a linear motor, or a linear motor may be used for the drive unit for driving the upper drive member 63 and the lower drive member 67.

Instead of the structure in which only the stator core 10 is removable from the support unit 30 in the first embodiment, the jig 20 may be removable from the support unit 30 together with the link mechanism 62. In such a structure, the plurality of coils 40 can be set in the jig 20 with the jig 20 and the link mechanism 62 removed from the support unit 30.

The number of slots 12 of the stator core 10 is not limited to 48, and may be greater than 48 (e.g., 60) or be less than 48 (e.g., 24 or 36).

The coil 40 is not limited to a cassette type including a set of a first side 41*a* and a second side 41*b*, and in which two ends of each of the first side 41*a* and the second side 41*b* are connected to the coil end 42*a* to form a coil. For example, a coil may include a plurality of tortoise shell shaped coils 40 is continued with a crossing line.

The coils 40 are not limited to lap winding in which distributed windings are coupled across two slots 12, and may be in a wave winding or concentric winding.

The coupling of the coils 40 to the stator core 10 is not limited to the method that inserts at least one of the first side 41*a* or the second side 41*b* of the coil 40 into all of the slots 12 of the stator core 10 in a single inserting step. For example, when coupling the coils 40 of the rotating electrical machine of three phases in concentric winding, the coils forming the U phase, the V phase, and the W phase are inserted in order. In this case, the total number of first sides 41*a* and second sides 41*b* of the coil of one phase among the U phase, the V phase, and the W phase is less than the number of slots 12 of the stator core 10, and the first side 41*a* or the second side 41*b* of the coil 40 is not inserted into all of the slots 12 in a single inserting step.

The stator core 10 is annular, and each slot 12 has an opening 12*a* that opens in the inner circumference of the stator core 10 and the slots 12 are formed such that the slot pitch increases from the openings 12*a* toward the bottom portions. For example, the stator core 10 may be a divided core type formed by joining a plurality of divided cores. Preferably, the divided core type is not used since the divided core type increases the motor loss.

A ball screw mechanism driven by the motor may be used in lieu of the cylinders 72, 74 in the first embodiment and the second embodiment. In this case, the driving of the pushing unit 50 and the link mechanism 62 may all be performed with the motor so that the pushing unit 50 and the link mechanism 62 are easily driven in a synchronized state.

In the second embodiment, other structures may be adopted for the structure of moving the support unit 30 to the standby position and the coil inserting position with respect to the stator core 10. For example, a normal roller may be arranged in lieu of the spherical roller 81, or a rail may be arranged on the support frame 80 and the support unit 30 may include plural wheels that roll on the rail.

DESCRIPTION OF SYMBOLS

S: stator
10: stator core
12: slot
12*a*, 31*a*: opening
20: jig
21: holding groove
30: support unit
40: coil
40*a*: winding wire
41*a*: first side serving as straight portion
41*b*: second side serving as straight portion
42*a*, 42*b*: coil end
50: pushing unit
51*a*, 51*b*: support plate
51*c*: straight guide groove
52*a*, 52*b*: turning plate
52*c*: spiral guide groove
53*a*, 53*b*: pushing member
53*c*: portion
53*d*: engagement portion
61: pushing member
62: link mechanism
63: upper drive member serving as drive force applying unit
67: lower drive member serving as drive force applying unit
72, 74: cylinder forming pushing unit

The invention claimed is:

1. A manufacturing device for a stator of a rotating electrical machine, wherein the stator includes an annular stator core, which includes a plurality of slots, and a coil attached to the stator core, each of the slots includes an opening, which opens in an inner circumference of the stator core, and a bottom portion, the slots are arranged at a slot pitch from an adjacent one of the slots, the slot pitch increases from the opening toward the bottom portion, and the coil includes a plurality of straight portions, which are respectively inserted into the slots, and a plurality of coil ends, which are continuous with the straight portions, the manufacturing device comprising:

a jig including a plurality of holding grooves into which the straight portions of the coil are insertable, wherein each of the holding grooves includes a bottom portion and an opening, adjacent ones of the holding grooves are arranged at a pitch that is the same as the openings of the adjacent ones of the slots in the stator core, and the jig is arrangeable at an inner side of the stator core when the holding grooves respectively face the openings of the slots;

a support unit that supports the stator core and the jig, which is arranged at the inner side of the stator core, in a concentric state;

a plurality of link mechanisms provided in the jig, wherein each of the link mechanisms includes a pushing member and a link, the pushing member is arrangeable closer to the bottom portion of each holding groove than the straight portion inserted into the holding groove, the link is arranged at an outer side of an end face of the stator core in an axial direction and at an inner side in a radial direction of the stator core from the pushing member, and the link moves the corresponding pushing member in a direction from the bottom portion of the holding groove toward the corresponding slot and from the slot toward the bottom portion;

a plurality of pushing units that simultaneously applies a pushing force from the axial direction of the stator core to all of the coil ends of the coil in synchronism with the link mechanism when the straight portions are respectively inserted into the holding grooves of the jig supported by the support unit and the coil ends respectively project outside in the axial direction of the stator core from an end face of a portion including the holding grooves of the jig;

an upper drive member;

a lower drive member;

an upper support member fixed to an upper end of the jig; and a lower support member fixed to a lower end of the jig, wherein the link includes:

an upper first link arranged in an upper portion of the jig, wherein the upper first link includes a first end that is pivotally coupled to an upper end of the corresponding pushing member and a second end that is pivotally coupled to the upper drive member, an upper second link including a first end that is pivotally coupled to the upper support member and a second end that is pivotally coupled to an intermediate portion of the upper first link;

a lower first link arranged at a lower portion of the jig, wherein the lower first link includes a first end that is pivotally coupled to a lower end of the corresponding pushing member and a second end that is pivotally coupled to the lower drive member; and a lower second link including a first end that is pivotally coupled to the lower support member and a second end that is pivotally coupled to an intermediate portion of the lower first link.

2. The manufacturing device for a stator of a rotating electrical machine according to claim 1, wherein each of the pushing units includes a pushing member that is provided for each of the coil ends and allows for application of a pushing force to each coil end toward a radially outer side of the stator core.

3. The manufacturing device for a stator of a rotating electrical machine according to claim 2, wherein the plurality of pushing units are two pushing units arranged at two axial sides of the stator core sandwiching the stator core supported by the support unit;

each of the two pushing units includes a support plate and a turning plate, wherein the support plate includes a plurality of straight guide grooves each extending parallel to the slots in correspondence with the slots of the stator core, and the turning plate includes a spiral guide groove and is supported to be turnable at a side of the support plate opposite to the stator core; and each pushing member includes a portion that is movable along the straight guide groove and an engagement portion that engages the spiral guide groove.

4. The manufacturing device for a stator of a rotating electrical machine according to claim 3, wherein the support plate of one of the two pushing units is movable with the corresponding turning plate and the pushing member to a position where the support plate is not an obstacle trouble when moving the stator core to a position where the stator core is supported by the support unit or when removing the stator core from the position where the stator is supported by the support unit.

5. The manufacturing device for a stator of a rotating electrical machine according to claim 1, wherein, the upper drive member and the lower drive member are located at two ends of the jig in the axial direction of the stator core, and the upper drive member and the lower drive member apply to at least each of the pushing member a drive force for moving the pushing member from the bottom portion of the corresponding holding groove to the corresponding slot.

6. The manufacturing device for a stator of a rotating electrical machine according to claim 5, wherein each of the link mechanisms uses a biasing force of a torsion spring as the drive force for moving the pushing member to the bottom portion of the holding groove.

7. The manufacturing device for a stator of a rotating electrical machine according to claim 1, wherein the support unit is formed to be movable to a standby position and an inserting position, the stator core and the jig are removed from the support unit at the standby position, and a center position of the stator core supported by the support unit is located coaxially with a pushing portion of the pushing unit to insert the coil into the stator core at the inserting position.

8. The manufacturing device for a stator of a rotating electrical machine according to claim 1, wherein the plurality of straight portions are a set of a first side and a second side, each of the plurality of coil ends is a coil end having a projecting shape, each of the first side and the second side includes a first end and a second end, and the coil ends are continuous with the first ends and the second ends.

* * * * *